United States Patent
Kenjo

(10) Patent No.: US 10,979,653 B2
(45) Date of Patent: Apr. 13, 2021

(54) IMAGE PROCESSING APPARATUS, IMAGING APPARATUS, IMAGE PROCESSING METHOD, AND PROGRAM

(71) Applicant: Sony Corporation, Tokyo (JP)

(72) Inventor: Yukinao Kenjo, Tokyo (JP)

(73) Assignee: Sony Corporation, Tokyo (JP)

(*) Notice: Subject to any disclaimer, the term of this patent is extended or adjusted under 35 U.S.C. 154(b) by 140 days.

(21) Appl. No.: 16/085,676

(22) PCT Filed: Jan. 30, 2017

(86) PCT No.: PCT/JP2017/003096
§ 371 (c)(1),
(2) Date: Sep. 17, 2018

(87) PCT Pub. No.: WO2017/187691
PCT Pub. Date: Nov. 2, 2017

(65) Prior Publication Data
US 2020/0228728 A1    Jul. 16, 2020

(30) Foreign Application Priority Data
Apr. 26, 2016   (JP) .............................. JP2016-087820

(51) Int. Cl.
| | |
|---|---|
| H04N 5/262 | (2006.01) |
| G06T 7/20 | (2017.01) |
| H04N 5/232 | (2006.01) |
| H04N 5/265 | (2006.01) |
| H04N 5/91 | (2006.01) |

(52) U.S. Cl.
CPC .............. *H04N 5/2628* (2013.01); *G06T 7/20* (2013.01); *H04N 5/232* (2013.01);
(Continued)

(58) Field of Classification Search
CPC ............. H04N 5/2628; H04N 5/23258; H04N 5/23267; H04N 5/265; H04N 5/91;
(Continued)

(56) References Cited

U.S. PATENT DOCUMENTS

| 7,956,899 B2* | 6/2011 | Kurokawa | ......... H04N 5/23267 |
| | | | 348/208.6 |
| 8,937,668 B2* | 1/2015 | Tsutsumi | .................. G06T 5/50 |
| | | | 348/218.1 |

(Continued)

FOREIGN PATENT DOCUMENTS

| JP | 2006-179966 A | 7/2006 |
| JP | 2007142507 | * 5/2007 |

(Continued)

OTHER PUBLICATIONS

Japanese Office Action dated Aug. 4, 2020 for corresponding Japanese Application No. 2016-087820.

*Primary Examiner* — Pritham D Prabhakher
(74) *Attorney, Agent, or Firm* — Michael Best & Friedrich LLP

(57) ABSTRACT

A capacity of a frame memory is reduced in an apparatus that performs image processing using the frame memory. An image processing apparatus includes a cutout processing unit, a frame memory, and a synthesis processing unit. Each time an input frame is imaged by an imaging unit, the cutout processing unit cuts out a part of the input frame as a current cutout frame on the basis of motion of the imaging unit. The frame memory holds the current cutout frame as a past cutout frame. The synthesis processing unit synthesizes the current cutout frame and the past cutout frame, and outputs a result as a synthesis frame.

16 Claims, 24 Drawing Sheets

(52) U.S. Cl.
CPC ..... *H04N 5/23258* (2013.01); *H04N 5/23267* (2013.01); *H04N 5/265* (2013.01); *H04N 5/91* (2013.01); *G06T 2207/20221* (2013.01)

(58) Field of Classification Search
CPC .. H04N 1/32614; H04N 1/327; H04N 1/3278; H04N 1/32789; H04N 1/32793; H04N 1/32795; H04N 1/32797; H04N 1/32791; H04N 1/333; H04N 1/33392; H04N 2201/333; G06T 7/20; G06T 7/207; G06T 7/215; G06T 7/246; G06T 7/248; G06T 7/254; G06T 7/285; G06T 2207/20221
USPC ...................................................... 348/208.2
See application file for complete search history.

(56) References Cited

U.S. PATENT DOCUMENTS

| | | | | |
|---|---|---|---|---|
| 9,294,675 | B2* | 3/2016 | Tsubaki | H04N 5/232 |
| 9,560,287 | B2* | 1/2017 | Thorn | H04N 5/23254 |
| 10,397,600 | B1* | 8/2019 | Xu | H04N 19/52 |
| 2009/0059017 | A1* | 3/2009 | Kurokawa | H04N 5/23232 348/208.1 |
| 2012/0236168 | A1* | 9/2012 | Tsutsumi | H04N 5/23267 348/208.4 |
| 2015/0138380 | A1* | 5/2015 | Tsubaki | H04N 5/23258 348/208.1 |
| 2015/0262341 | A1* | 9/2015 | Nash | G06T 5/50 348/208.6 |
| 2015/0381878 | A1* | 12/2015 | Mishima | H04N 5/2356 348/241 |
| 2016/0057445 | A1* | 2/2016 | Tsubaki | H04N 19/521 382/236 |
| 2016/0182798 | A1* | 6/2016 | Thorn | H04N 5/23232 348/208.1 |

FOREIGN PATENT DOCUMENTS

| | | | |
|---|---|---|---|
| JP | 2007142507 | * | 6/2007 |
| JP | 2009-232382 A | | 10/2009 |

* cited by examiner

FIG. 5
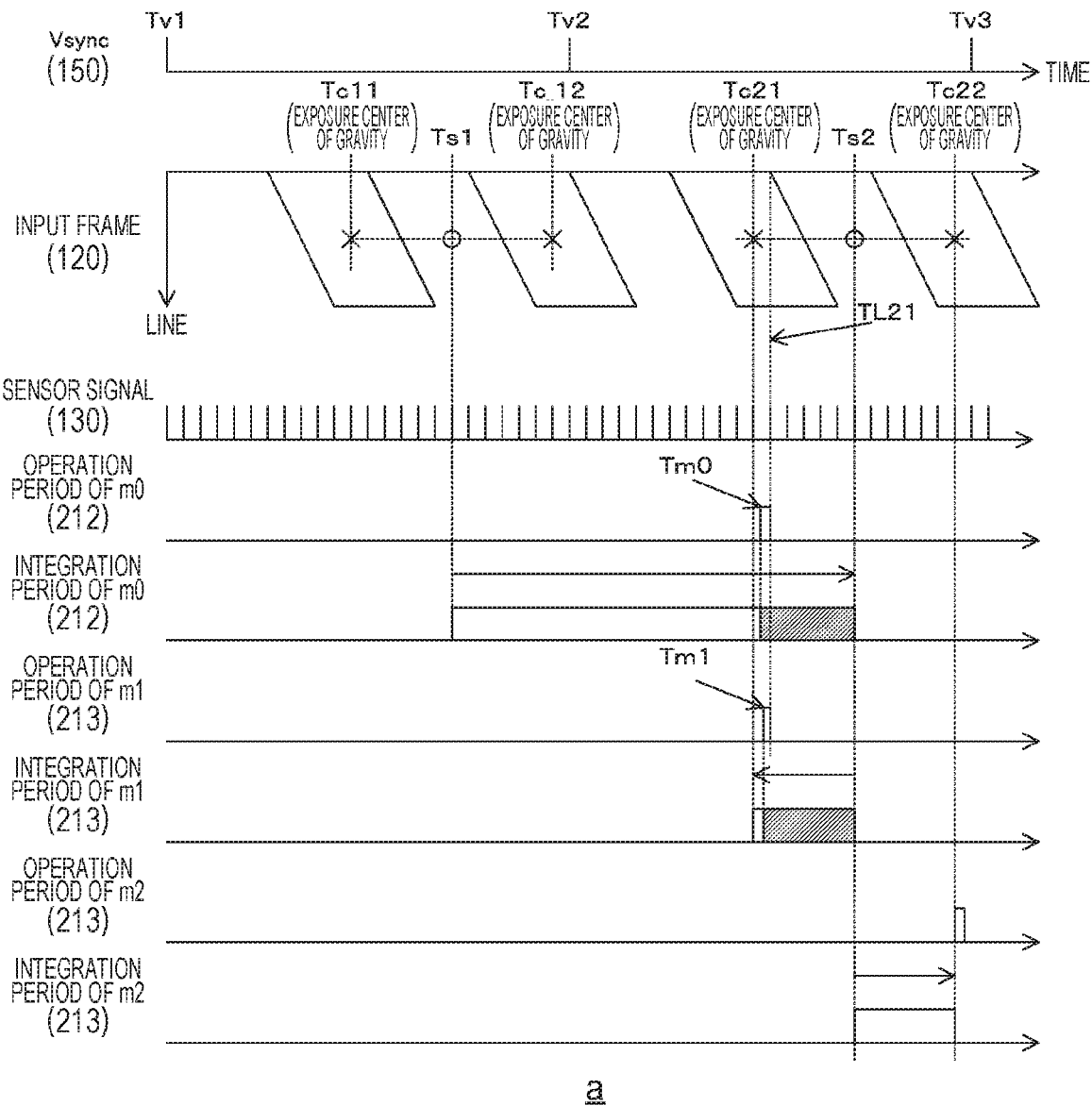
a
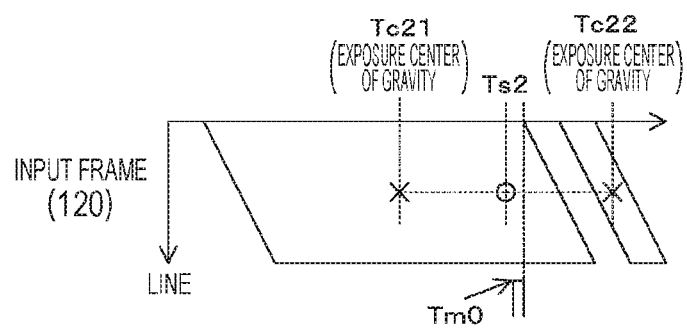
b

FIG. 17

| | EFFECT OF IMAGE SYNTHESIS | EFFECT OF ELECTRONIC CAMERA SHAKE CORRECTION |
|---|---|---|
| EMBODIMENT | LARGE | LARGE |
| FIRST MODIFICATION | LARGE | SMALL (INCOMPATIBLE WITH ROTATION CORRECTION) |
| SECOND MODIFICATION | SMALL (IMAGE QUALITY IS REDUCED DEPENDING ON MOTION) | SMALL (INCOMPATIBLE WITH ROTATION CORRECTION) |
| COMPARATIVE EXAMPLE | LARGE | LARGE |

FIG. 18

| | FRAME SIZE OF SYNTHESIS TARGET | FRAME SIZE AFTER SYNTHESIS | FRAME MEMORY USE AMOUNT IN SYNTHESIS PROCESSING |
|---|---|---|---|
| EMBODIMENT | $(w+2rx+2nx) \times (h+2ry+2ny)$ | $r1^2 \times (w+2rx+2nx) \times (h+2ry+2ny)$ | $\{(N-1)+r1^2\} \times (w+2rx+2nx) \times (h+2ry+2ny)$ |
| FIRST MODIFICATION | $(w+2nx) \times (h+2ny)$ | $r1^2 \times (w+2nx) \times (h+2ny)$ | $\{(N-1)+r1^2\} \times (w+2nx) \times (h+2ny)$ |
| SECOND MODIFICATION | $(w+2nx) \times (h+2ny)$ | --- | $(N-1) \times (w+2nx) \times (h+2ny)$ |
| COMPARATIVE EXAMPLE | $(w+2sx+2nx) \times (h+2sy+2sy)$ | $r1^2 \times (w+2sx+2nx) \times (h+2sy+2ny)$ | $\{(N-1)+r1^2\} \times (w+2sx+2nx) \times (h+2sy+2ny)$ |

FIG. 19

|  | FRAME SIZE OF CAMERA SHAKE CORRECTION TARGET | FRAME MEMORY USE AMOUNT IN CAMERA SHAKE CORRECTION |
|---|---|---|
| EMBODIMENT | (w+2sx+2nx) × (h+2sy+2ny) | (w+2rx) × (h+2ry) |
| FIRST MODIFICATION | (w+2sx+2nx) × (h+2sy+2ny) | — |
| SECOND MODIFICATION | (w+2sx+2nx) × (h+2sy+2ny) | — |
| COMPARATIVE EXAMPLE | (w+2sx) × (h+2sy) | (w+2sx) × (h+2sy) |

FIG. 20

|  | FRAME SIZE OF SYNTHESIS TARGET | RANGE TO BE REDUCED BY SYNTHESIS | FRAME MEMORY USE AMOUNT IN SYNTHESIS PROCESSING |
|---|---|---|---|
| EMBODIMENT | 75.60% | 18.90% | 0.945 |
| FIRST MODIFICATION | 64.00% | 16.00% | 0.800 |
| SECOND MODIFICATION | 64.00% | — | 0.640 |
| COMPARATIVE EXAMPLE | 100.00% | 25.00% | 1.250 |

|  | FRAME SIZE OF CAMERA SHAKE CORRECTION TARGET | FRAME MEMORY USE AMOUNT IN CAMERA SHAKE CORRECTION |
|---|---|---|
| EMBODIMENT | 100.00% | 0.6880 |
| FIRST MODIFICATION | 100.00% | — |
| SECOND MODIFICATION | 100.00% | — |
| COMPARATIVE EXAMPLE | 92.16% | 0.9216 |

| | FRAME SIZE OF SYNTHESIS TARGET | RANGE TO BE REDUCED BY SYNTHESIS | FRAME MEMORY USE AMOUNT IN SYNTHESIS PROCESSING |
|---|---|---|---|
| EMBODIMENT | 75.60% | 18.90% | 2.457 |
| FIRST MODIFICATION | 64.00% | 16.00% | 2.08 |
| SECOND MODIFICATION | 64.00% | — | 1.92 |
| COMPARATIVE EXAMPLE | 100.00% | 25.00% | 3.25 |

FIG. 25

| | FRAME SIZE OF SUBJECT MOTION DETECTION TARGET | DETECTION RANGE OF SUBJECT MOTION DETECTION | CALCULATION AMOUNT OF SUBJECT MOTION DETECTION PROCESSING |
|---|---|---|---|
| EMBODIMENT | $r1^2 \times (w+2rx+2nx) \times (h+2ry+2ny)$ | $(2qx) \times (2qy)$ | $(N-1) \times r1^2 \times (w+2rx+2nx) \times (h+2ry+2ny) \times s1^2 \times 2qx \times 2qy$ |
| FIRST MODIFICATION | $r1^2 \times (w+2nx) \times (h+2ny)$ | $(2qx) \times (2qy)$ | $(N-1) \times r1^2 \times (w+2nx) \times (h+2ny) \times s1^2 \times 2qx \times 2qy$ |
| SECOND MODIFICATION | — | — | — |
| COMPARATIVE EXAMPLE | $r1^2 \times (w+2sx+2nx) \times (h+2sy+2ny)$ | $(2px+2qx) \times (2py+2qy)$ | $(N-1) \times r1^2 \times (w+2sx+2nx) \times (h+2sy+2ny) \times s1^2 \times (2px+2qx) \times (2py+2qy)$ |

FIG. 26

| | FRAME SIZE OF SUBJECT MOTION DETECTION TARGET | DETECTION RANGE OF SUBJECT MOTION DETECTION | CALCULATION AMOUNT OF SUBJECT MOTION DETECTION PROCESSING |
|---|---|---|---|
| EMBODIMENT | 18.90% | 0.60% | 2.025E−05 |
| FIRST MODIFICATION | 16.00% | 0.60% | 1.500E−05 |
| SECOND MODIFICATION | — | — | — |
| COMPARATIVE EXAMPLE | 25.00% | 2.40% | 9.375E−05 |

| | FRAME SIZE OF SUBJECT MOTION DETECTION TARGET | DETECTION RANGE OF SUBJECT MOTION DETECTION | CALCULATION AMOUNT OF SUBJECT MOTION DETECTION PROCESSING |
|---|---|---|---|
| EMBODIMENT | 18.90% | 0.60% | 6.075E-05 |
| FIRST MODIFICATION | 16.00% | 0.60% | 4.500E-05 |
| SECOND MODIFICATION | --- | --- | --- |
| COMPARATIVE EXAMPLE | 25.00% | 2.40% | 2.813E-04 |

# IMAGE PROCESSING APPARATUS, IMAGING APPARATUS, IMAGE PROCESSING METHOD, AND PROGRAM

TECHNICAL FIELD

The present technology relates to an image processing apparatus, an imaging apparatus, an image processing method, and a program for causing a computer to perform the method. Particularly, the present technology relates to an image processing apparatus that holds a frame in a frame memory, an imaging apparatus, an image processing method, and a program for causing a computer to perform the method.

BACKGROUND ART

Conventionally, image processing such as electronic camera shake correction or image synthesis processing is performed for the purpose of improving the image quality of an image in an imaging apparatus that images an image. Among these processes, the electronic camera shake correction is processing of previously defining a size of a region to be cut out within a frame, moving the area from an initial position along a camera shake direction, and cutting out the region. Furthermore, the image synthesis processing is processing of synthesizing a plurality of frames for the purpose of expanding a dynamic range and reducing noise. As an apparatus for performing such image processing, for example, an image processing apparatus that synthesizes a frame delayed by a frame memory and a frame before delay so that a synthesis frame is generated, and further performs electronic camera shake correction on the synthesis frame, is proposed (for example, see Patent Document 1).

CITATION LIST

Patent Document

Patent Document 1: Japanese Patent Application Laid-Open No. 2009-232382

SUMMARY OF THE INVENTION

Problems to be Solved by the Invention

In the above-described conventional technique, electronic camera shake correction is performed after synthesis processing using a frame memory. However, in this configuration, there is a problem that as a resolution of an image becomes higher, a capacity of the frame memory required for the synthesis becomes larger. As the capacity of the frame memory increases, the calculation amount required for the synthesis processing and the cost of an imaging apparatus increase. Thus, it is desirable that the capacity of the frame memory is small.

The present technology has been created in view of such a situation and aims to reduce the capacity of a frame memory in an apparatus that performs image processing using the frame memory.

Solutions to Problems

The present technology has been made to solve the above-mentioned problems, and a first aspect of the present technology is to provide: an image processing apparatus including a cutout processing unit that cuts out a part of an input frame as a current cutout frame on the basis of motion of an imaging unit each time the input frame is imaged by the imaging unit, a frame memory that holds the current cutout frame as a past cutout frame, and a synthesis processing unit that synthesizes the current cutout frame and the past cutout frame and outputs a result as a synthesis frame; an image processing method, and a program for causing a computer to perform the method. With this configuration, the present technology has an effect that a part of the input frame is cut out before the synthesis of the frames.

Furthermore, in this first aspect, the image processing apparatus may further include: a motion amount acquisition unit that acquires a motion amount of the imaging unit within a period from one to another of exposure timings of each of consecutive two of the synthesis frames, as a motion amount between synthesis frames; and a synthesis frame correction unit that cuts out a part of the synthesis frame as an output frame on the basis of the motion amount between synthesis frames. With this configuration, the present technology has an effect that a part of the synthesis frame is cut out as an output frame on the basis of the motion amount between synthesis frames.

Furthermore, in this first aspect, the image processing apparatus may further include a motion amount acquisition unit that acquires a motion amount of the imaging unit within a period from a starting point timing that is between one exposure timing and another exposure timing of consecutive two of the current cutout frames, to the one exposure timing, as a motion amount within synthesis frame, and the cutout processing unit may cut out the current cutout frame on the basis of the motion amount within synthesis frame and supply a result to the holding unit. With this configuration, the present technology has an effect that the current cutout frame is cut out on the basis of the motion amount within synthesis frame.

Furthermore, in this first aspect, the motion amount between synthesis frames may include a first prediction value indicating the motion amount within a first prediction period from a first start timing in which operation of the motion amount between synthesis frames starts, to the starting point timing, and the motion amount acquisition unit may acquire the first prediction value on the basis of the motion amount up to the first start timing. With this configuration, the present technology has an effect that the first prediction value is acquired on the basis of the motion amount up to the first start timing.

Furthermore, in this first aspect, a length of the first prediction period may not exceed a predetermined threshold. With this configuration, the present technology has an effect that the motion amount within the first prediction period that is equal to or shorter than the threshold is acquired.

Furthermore, in this first aspect, the motion amount within synthesis frame may include a second prediction value indicating the motion amount within a second prediction period from a second start timing in which operation of the motion amount within synthesis frame starts, to the starting point timing, and the motion amount acquisition unit may acquire the second prediction value on the basis of the motion amount of the imaging unit up to the second start timing. With this configuration, the present technology has an effect that the second prediction value is acquired on the basis of the motion amount up to the second start timing.

Furthermore, in the first aspect, a length of the second prediction period may not exceed the predetermined threshold. With this configuration, the present technology has an effect that the motion amount within the second prediction period that is equal to or shorter than the threshold is acquired.

Furthermore, in this first aspect, the image processing apparatus may further include a subject motion detection unit that detects a motion vector indicating a direction in which a subject has moved, on the basis of consecutive two of the current cutout frames, and the synthesis processing unit may synthesize the current cutout frame and the past cutout frame on the basis of the motion vector. With this configuration, the present technology has an effect that the current cutout frame and the past cutout frame are synthesized on the basis of the motion vector.

Furthermore, a second aspect of the present technology is an imaging apparatus including: an imaging unit that images an input frame; an input frame cutout processing unit that cuts out a part of the input frame as a current cutout frame on the basis of motion of the imaging unit each time the input frame is imaged; a frame memory that holds the current cutout frame as a past cutout frame; and a synthesis processing unit that synthesizes the current cutout frame and the past cutout frame and outputs a result as a synthesis frame. With this configuration, the present technology has an effect that a part of the input frame is cut out before the synthesis of the frames.

Furthermore, in this second aspect, the imaging apparatus may further include a sensor that detects motion of the imaging unit. With this configuration, the present technology has an effect that a part of the input frame is cut out on the basis of the motion detected by the sensor.

Effects of the Invention

The present technology can exhibit an excellent effect that a capacity of a frame memory can be reduced in an apparatus that performs image processing using the frame memory. Note that the effects described herein are not necessarily limitative and the effects of the present technology may be any of effects described in the present disclosure.

BRIEF DESCRIPTION OF THE DRAWINGS

FIG. 5 is a timing chart showing an example of operation of the camera motion operation unit in the embodiment of the present technology.

FIG. 17 is a diagram summarizing the respective effects of the embodiment, the first and second modifications, and the comparative example of the present technology.

FIG. 18 is a diagram for comparing frame memory use amounts at the time of synthesis processing in each of the embodiment, the first and second modifications, and the comparative example of the present technology.

FIG. 19 is a diagram for comparing frame memory use amount at the time of camera shake correction in each of the embodiment, the first and second modifications, and the comparative example of the present technology.

FIG. 20 is a specific example of frame memory use amounts at the time of synthesis processing of N=2 in each of the embodiment, the first and second modifications, and the comparative example of the present technology.

FIG. 25 is a diagram for comparing a calculation amount at the time of subject motion detection of N=2 in each of the embodiment, the first and second modifications, and the comparative example of the present technology.

FIG. 26 is a specific example of the calculation amounts at the time of subject motion detection of N=2 in each of the embodiment, the first and second modifications, and the comparative example of the present technology.

MODE FOR CARRYING OUT THE INVENTION

Figure 1:
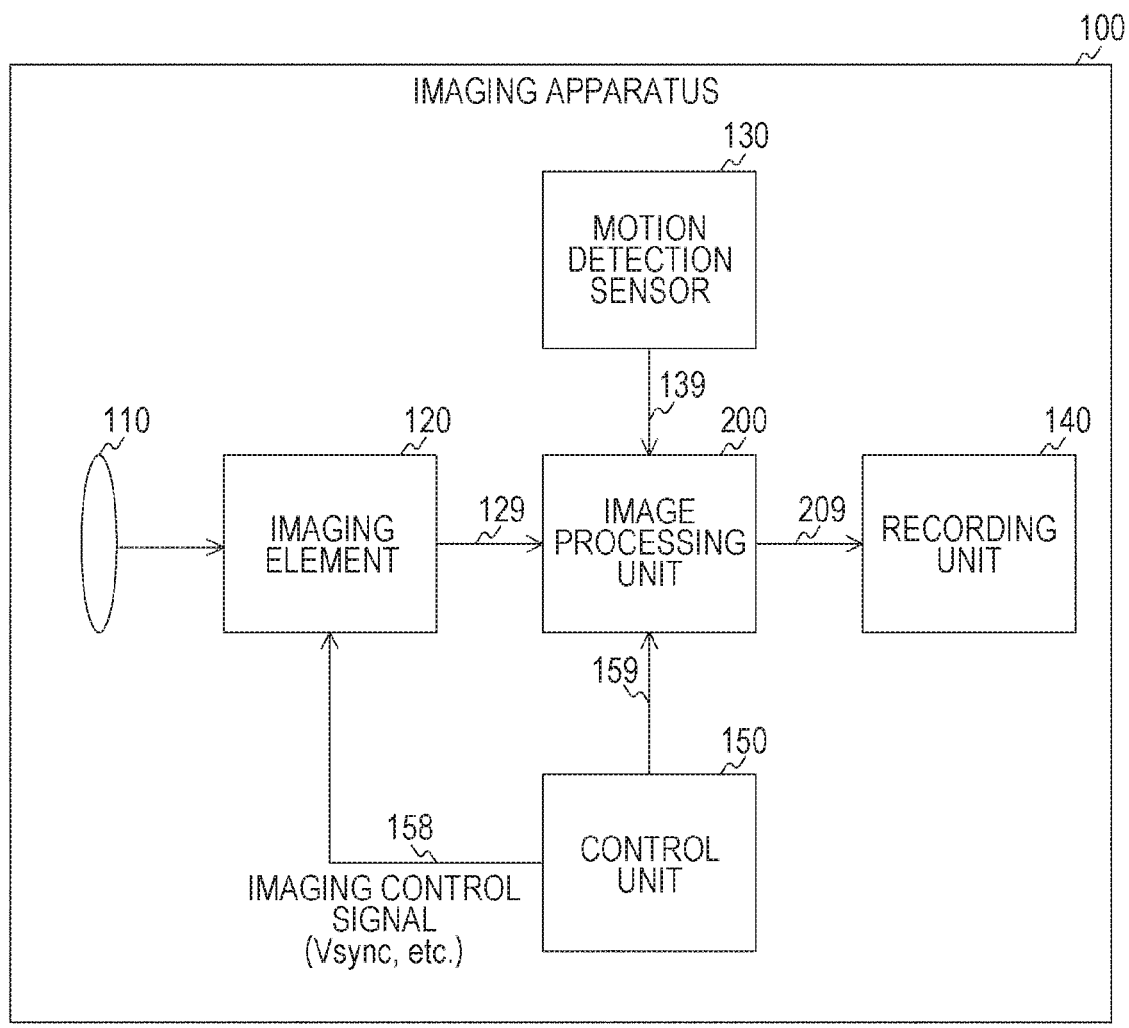
FIG. 1 is a block diagram showing a configuration example of an imaging apparatus in an embodiment of the present technology.

Hereinafter, a mode for carrying out the present technology (hereinafter referred to as an embodiment) will be described. The description will be given in the following order.
1. Embodiment (an example in which a part of a frame is cut out and then synthesized)
2. First Modification
3. Second Modification
4. Third Modification 1. Embodiment Configuration Example of Imaging Apparatus FIG. 1 is a block diagram showing a configuration example of an imaging apparatus 100 in an embodiment. This imaging apparatus 100 images image data (frame), and includes an imaging lens 110, an imaging element 120, a motion detection sensor 130, an image processing unit 200, a recording unit 140, and a control unit 150. As the imaging apparatus 100, in addition to a digital camera such as a digital still camera or a digital video camera, a smartphone, a personal computer, or the like having an imaging function is assumed.

The imaging lens 110 is a lens that collects light and guides the light to the imaging element 120. The imaging element 120 photoelectrically converts incident light from the imaging lens 110 in accordance with control of the control unit 150 to image the image data. This imaging element 120 supplies the image data to the image processing unit 200 via a signal line 129, as an input frame. Note that the unit including the imaging lens 110 and the imaging element 120 is an example of the imaging unit described in the claims.

The motion detection sensor 130 detects motion of the imaging apparatus 100. For example, a gyro sensor that detects an angle (in other words, angular velocity) at which the imaging apparatus 100 rotates within a unit time is used as the motion detection sensor 130. The motion detection sensor 130 measures the rotation angle within the time for each unit time and supplies a sensor signal indicating the measurement value to the image processing unit 200 via a signal line 139. Note that the motion detection sensor 130 is an example of the sensor described in the claims.

The image processing unit 200 performs predetermined image processing on the input frame using a sensor signal, in accordance with the control of the control unit 150. This image processing unit 200 supplies the frame after the image processing to the recording unit 140 via a signal line 209, as an output frame.

The recording unit 140 records the output frame. The control unit 150 controls the entire imaging apparatus 100. This control unit 150 supplies an imaging control signal to the imaging element 120 via a signal line 158, and supplies a timing signal indicating a timing of image processing to the image processing unit 200 via a signal line 159.

Here, the imaging control signal includes a vertical synchronization signal Vsync indicating an imaging timing, an exposure period, or the like. A frequency of the vertical synchronization signal Vsync is, for example, 30 hertz (Hz). Note that the frequency of the vertical synchronization signal Vsync is not limited to 30 hertz (Hz), but may be 60 hertz (Hz) or the like.

Figure 2:
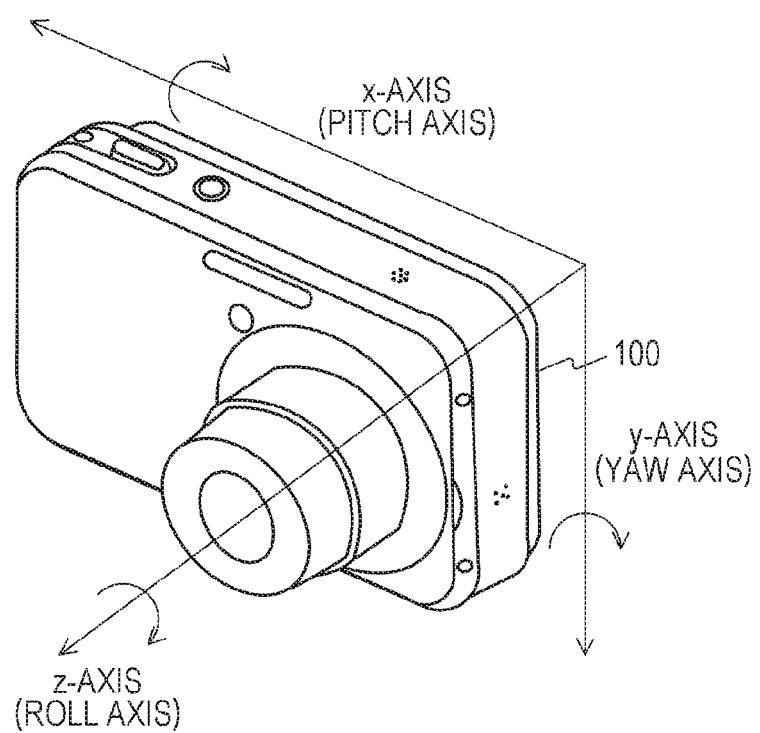
FIG. 2 is an example of a perspective view of the imaging apparatus in the embodiment of the present technology.

FIG. 2 is an example of a perspective view of the imaging apparatus 100 according to the embodiment. An optical axis of the imaging apparatus 100 is defined as a z-axis. Furthermore, an axis orthogonal to the z-axis and parallel to a long side of the imaging element 120 is defined as an x-axis, and an axis orthogonal to the z-axis and the x-axis is defined as a y-axis. Each time the unit time elapses, the motion detection sensor 130 measures the angle at which the imaging apparatus 100 rotates around the z-axis within the unit time, as a roll angle. Furthermore, the motion detection sensor 130 measures the angle at which the imaging apparatus 100 rotates around the x-axis within the unit time as a pitch angle and measures the angle at which the imaging apparatus 100 rotates around the y-axis within the unit time as a yaw angle.

Note that although the motion detection sensor 130 measures angles for all three axes, the motion detection sensor 130 may measure angles for only two axes. Furthermore, although the motion detection sensor 130 measures the angle, the motion detection sensor 130 may measure a physical quantity other than the angle, as long as the motion of the imaging apparatus 100 can be detected. For example, the motion detection sensor 130 may measure the accelerations in the x-axis direction and the y-axis direction.

Configuration Example of Image Processing Unit

Figure 3:
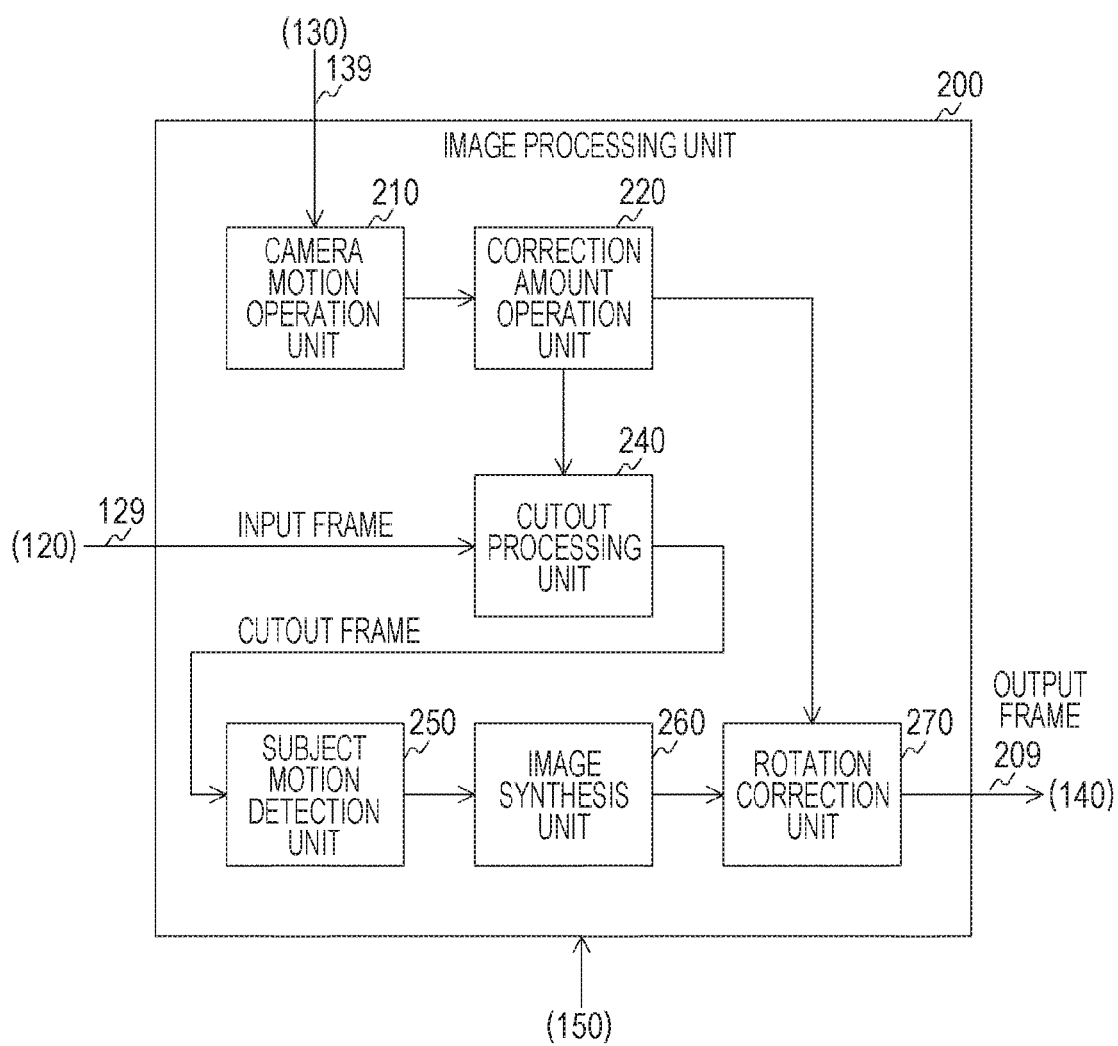
FIG. 3 is a block diagram showing a configuration example of an image processing unit in the embodiment of the present technology.

FIG. 3 is a block diagram showing a configuration example of the image processing unit 200 in the embodiment. This image processing unit 200 includes a camera motion operation unit 210, a correction amount operation unit 220, a cutout processing unit 240, a subject motion detection unit 250, an image synthesis unit 260, and a rotation correction unit 270.

The camera motion operation unit 210 acquires a motion amount of the imaging apparatus 100 within a certain period by operation with respect to the sensor signal. This camera motion operation unit 210 supplies an operation result to the correction amount operation unit 220. Note that the camera motion operation unit 210 is an example of the motion amount acquisition unit described in the claims.

The correction amount operation unit 220 operates a correction amount from an initial position of a cutout region in the cutout processing unit 240 and the rotation correction unit 270, by using the operation result of the camera motion operation unit 210. This correction amount includes x-component, y-component, and roll angle component. The x-component is a motion amount of when the cutout region is translated along the x-axis direction, and the y-component is a motion amount of when the region is translated along the y-axis direction. The roll angle component is a rotation angle of when a part of the frame is rotated. The correction amount operation unit 220 supplies the x-component and the y-component to the cutout processing unit 240, and supplies the roll angle component to the rotation correction unit 270.

The cutout processing unit 240 cuts out a part of the input frame on the basis of the correction amount (x-component and y-component) each time the input frame is imaged. In this input frame, a cutout region of a predetermined size is preset. The cutout processing unit 240 translates the cutout region for the amount of the x-component along the x-axis from the initial position, and translates the cutout region for the amount of the y-component along the y-axis from the initial position. Then, the cutout processing unit 240 cuts out the cutout region after the translation, as a cutout frame, from the input frame. The cutout processing unit 240 supplies the cutout frame to the subject motion detection unit 250.

The subject motion detection unit 250 detects a motion vector of a subject from a plurality of consecutive cutout frames. The subject motion detection unit 250 detects a moving subject from a plurality of consecutive cutout frames using, for example, the frame subtraction method or the block matching method, and determines a motion vector indicating a direction and a distance in which the moving subject has moved. The subject motion detection unit 250 supplies the motion vector to the image synthesis unit 260.

The image synthesis unit 260 synthesizes consecutive N (N is an integer of two or more) cutout frames. The image synthesis unit 260 generates one synthesis frame for every N sheets and supplies a result to the rotation correction unit 270, as the synthesis frame.

The above-described imaging element 120 synchronizes with a vertical synchronization signal Vsync, and images N frames within a period of the Vsync. For example, when it is assumed that N=2 and the vertical synchronization signal Vsync is 30 hertz (Hz), 60 input frames are imaged in a second, and 30 synthesis frames are generated in a second.

The rotation correction unit 270 rotates a part of the cutout region in the synthesis frame on the basis of the correction amount (roll angle component). The rotation correction unit 270 cuts out the cutout region after the rotation as an output frame, and outputs the output frame to the recording unit 140. Note that the rotation correction unit 270 is an example of the synthesis frame correction unit described in the claims.

Configuration Example of Camera Motion Operation Unit

Figure 4:
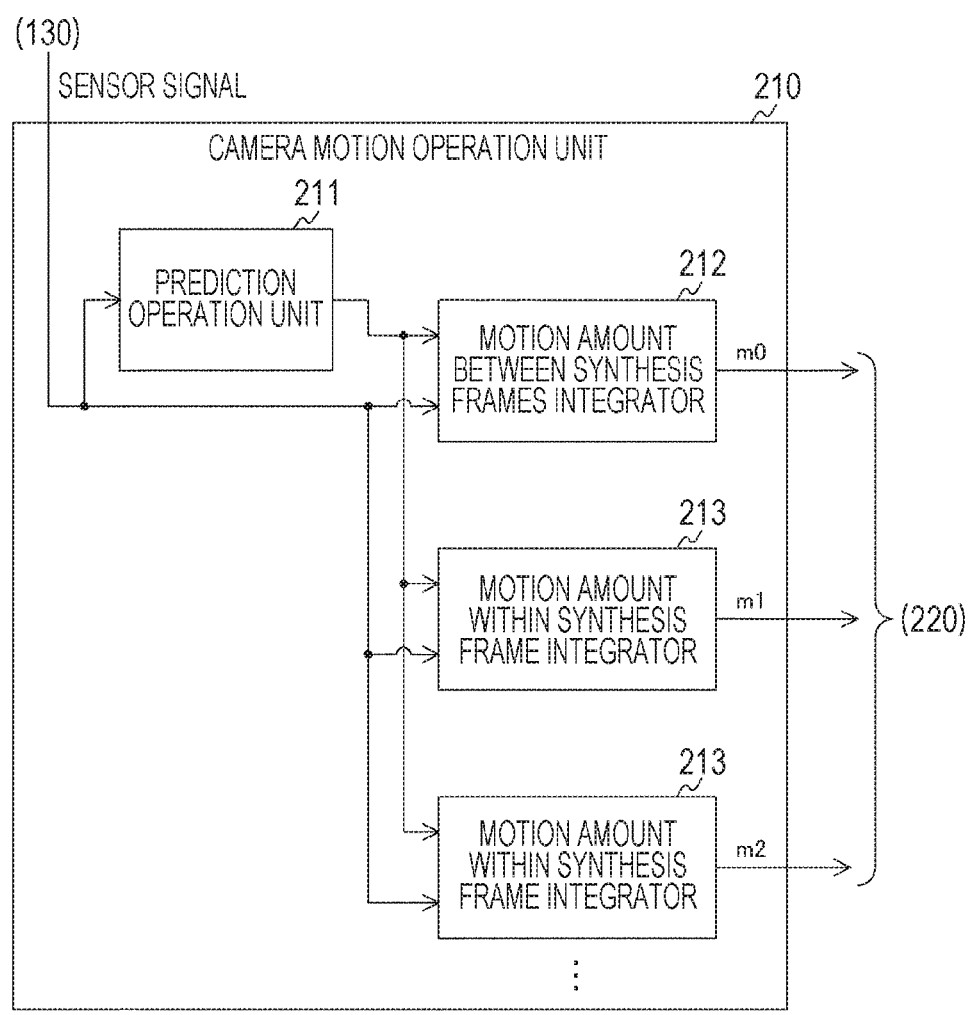
FIG. 4 is a block diagram showing a configuration example of a camera motion operation unit in the embodiment of the present technology.

FIG. 4 is a block diagram showing a configuration example of the camera motion operation unit 210 in the embodiment. This camera motion operation unit 210 includes a prediction operation unit 211, a motion amount between synthesis frames integrator 212, and N motion amount within synthesis frame integrators 213.

The prediction operation unit 211 determines a function for calculating the motion amount of the imaging apparatus 100 within the prediction period on the basis of a history of the sensor signal before a predetermined prediction period. The prediction operation unit 211 determines an m-th degree polynomial that fits best to a curve representing temporal variation of a sensor signal before the prediction period, for example. The prediction operation unit 211 supplies the determined coefficients of the m-th degree polynomial to the motion amount between synthesis frames integrator 212 and the N motion amount within synthesis frame integrators 213.

The motion amount between synthesis frames integrator 212 operates a motion amount m0 of the imaging apparatus 100 within an integration period Pm0 between consecutive two synthesis frames. The motion amount m0 includes a pitch angle component, a yaw angle component, and a roll angle component. Furthermore, the operation of the motion amount m0 is started before the end of the integration period Pm0. For this reason, the motion amount between synthesis frames integrator 212 needs to predict the motion amount within the prediction period from a start time point of the operation of m0 to an end time point of the integration period Pm0.

Therefore, the motion amount between synthesis frames integrator 212 operates the motion amount within the prediction period using the m-th degree polynomial, and adds the motion amount to an integrated value of the motion amounts up to the prediction period. The motion amount between synthesis frames integrator 212 supplies the added value to the correction amount operation unit 220 as the motion amount m0.

The motion amount within synthesis frame integrator 213 operates the motion amount mn for n-th (n is an integer from 1 to N) of the N cutout frames to be synthesized. First, a specific timing between a timing Tc1 of the center of gravity of an exposure period of the first cutout frame of N cutout frames, and a timing TcN of the center of gravity of the exposure period of the N-th cutout frame is set as the starting point timing Ts.

In the case of the timing Tcn of the center of gravity of the exposure period of the n-th cutout frame, the motion amount within the integration period from the starting point timing Ts to Tcn is operated as mn. Here, in the case where the start timing of the operation of the motion amount mn is before the end timing of the corresponding integration period, the motion amount within synthesis frame integrator 213 needs to predict the motion amount up to the end timing. On the other hand, in the case where the start timing of the operation of the motion amount mn is later than the end timing of the corresponding integration period, there is no need to predict the motion amount. The motion amount within synthesis frame integrator 213 performs prediction operation by using the m-th degree polynomial as necessary to determine the motion amount mn, and supplies the motion amount mn to the correction amount operation unit 220.

a in FIG. 5 is a timing chart showing an example of operation of the camera motion operation unit 210 in the embodiment. The vertical synchronization signal Vsync rises at a constant period. For example, the vertical synchronization signal Vsync rises at timings Tv 1, Tv 2, and Tv 3.

In a case where it is assumed that N=2, two input frames are imaged within the period of the vertical synchronization signal Vsync. The timings of the center of gravity of the exposure period of each of the two input frames imaged during from the timing Tv1 to the timing Tv2 are defined as Tc11 and Tc12. Furthermore, the timings of the center of gravity of the exposure period of each of the two input frames imaged during from the timing Tv_2 to the timing Tv3 are defined as Tc21 and Tc22. Furthermore, an intermediate timing between Tc11 and Tc12 is defined as the starting point timing Ts1, and the intermediate timing between Tc21 and Tc22 is defined as the starting point timing Ts2.

Each time a period shorter than the vertical synchronization signal Vsync elapses, the motion detection sensor 130 detects motion and outputs a sensor signal.

The motion amount between synthesis frames integrator 212 operates the motion amount in the integration period from the starting point timing Ts1 to the starting point timing Ts2 as m0. On the other hand, the motion amount within synthesis frame integrator 213 corresponding to the first cutout frame operates the motion amount within an adjustment period from the starting point timing Ts2 to the timing Tc21 as m1.

Furthermore, the motion amount within synthesis frame integrator 213 corresponding to the second frame operates the motion amount within the adjustment period from the starting point timing Ts2 to the timing Tc22 as the motion amount m2.

Here, the operation of the motion amount m1 needs to be completed before the timing TL21 at which the exposure of the first line ends in the first cutout frame of the two cutout frames to be synthesized. This is because holding of the first frame is started after the timing TL21 and the cutout region is adjusted by the motion amount m1 at the time of this holding. Furthermore, in addition to the motion amount m1, the motion amount m0 is also used for operation of the correction amount of this first frame. Therefore, it is necessary to complete the motion amount m0 by the timing TL21.

Therefore, the motion amount between synthesis frames integrator 212 starts operation of the motion amount m0 at the timing Tm0 that is earlier by the time required for the operation of m0 than the timing TL21. This timing Tm0 is, for example, earlier than the end time Ts2 of the integration period of m0. For this reason, the motion amount between synthesis frames integrator 212 needs to perform prediction operation the motion amount within the prediction period from the timing Tm0 to the starting point timing Ts2 as a prediction value. The motion amount between synthesis frames integrator 212 determines an actual measurement value of the motion amount by integrating the sensor signals from the starting point timing Ts1 to the timing Tm0, and adds the actual measurement value to the prediction value to make a result to be m0. The hatched period in the drawing indicates the prediction period.

Furthermore, the motion amount within synthesis frame integrator 213 starts operation of the motion amount m1 at the timing Tm1 that is earlier by the time required for the operation of m1 than the timing TL21. This timing Tm1 is, for example, earlier than the starting point timing Ts2. For this reason, the motion amount within synthesis frame integrator 213 needs to perform prediction operation the motion amount within the prediction period from the timing Tm1 to the starting point timing Ts2 as a prediction value. The motion amount within synthesis frame integrator 213 determines an actual measurement value of the motion amount by integrating the sensor signals from the timing Tc21 to the timing Tm1, and adds the actual measurement value to the prediction value to operate m1. The hatched period in the drawing indicates the prediction period.

Furthermore, it is sufficient that the operation of the motion amount m2 is completed before the timing at which the exposure of the first line ends in the second cutout frame of the two cutout frames to be synthesized. For example, the motion amount within synthesis frame integrator 213 starts operation of the motion amount m2 at the timing Tc22. This timing Tc22 is later than the starting point timing Ts2. Therefore, the motion amount within synthesis frame integrator 213 determines the motion amount m2 by integrating the sensor signals from the starting point timing Ts2 to the timing Tc22 without performing prediction operation.

In accordance with the operated motion amounts m1 and m2, the cutout processing unit 240 translates the cutout region of each of consecutive two frames, and cuts out the frames. Since these motion amounts m1 and m2 have the starting point that is the common timing (Ts2), the positions of the cutout regions of the respective frames can be aligned with the regions where the same subject is captured in the two frames.

Here, it is also conceivable that the cutout processing unit 240 translates the cutout region of the second frame of the frames to be synthesized, in accordance with the motion amount within the period of the length L from the timing Tc21 to the timing Tc22. In this case, also in the first frame, the cutout region is translated in accordance with the motion amount within the period of the length L up to the timing Tc21. However, in this method, while it is not necessary to perform the prediction operation of the first cutout frame, the motion amount of the translation of the cutout region of each of the first and second cutout frames becomes large. Actually, since the cutout region can be moved only within a certain frame, if the motion amount is large, there is a possibility that accuracy of positioning decreases in synthesis. Furthermore, there is a possibility that the time centroid of the result of synthesis is greatly missed, and the accuracy of electronic camera shake correction between synthesis frames is greatly deteriorated.

On the other hand, in the imaging apparatus 100, since the cutout region is translated in accordance with the motion amount from the starting point timing Ts2 that is intermediate of the timing Tc21 and Tc22, to Tc21 or Tc22, the motion amount of the cutout region can be relatively small. Therefore, the accuracy of positioning in the synthesis can be increased. Furthermore, it is possible to prevent deterioration in the accuracy of electronic camera shake correction between synthesis frames.

Note that although the timings Tm0 and Tm1 at which the operation of the motion amounts m0 and m1 is performed are set to be earlier than the starting point timing Ts2, the timings are not limited to these. For example, there is a case where the image synthesis unit 260 synthesizes a frame of long exposure and a frame of short exposure (so-called high dynamic range synthesis). In this high dynamic range synthesis, in a case where the frame of long exposure is the first frame, Tm0 and Tm1 may be later than the starting point timing Ts2 as exemplified in b in FIG. 5, and in that case, prediction operation is unnecessary.

Figure 6:
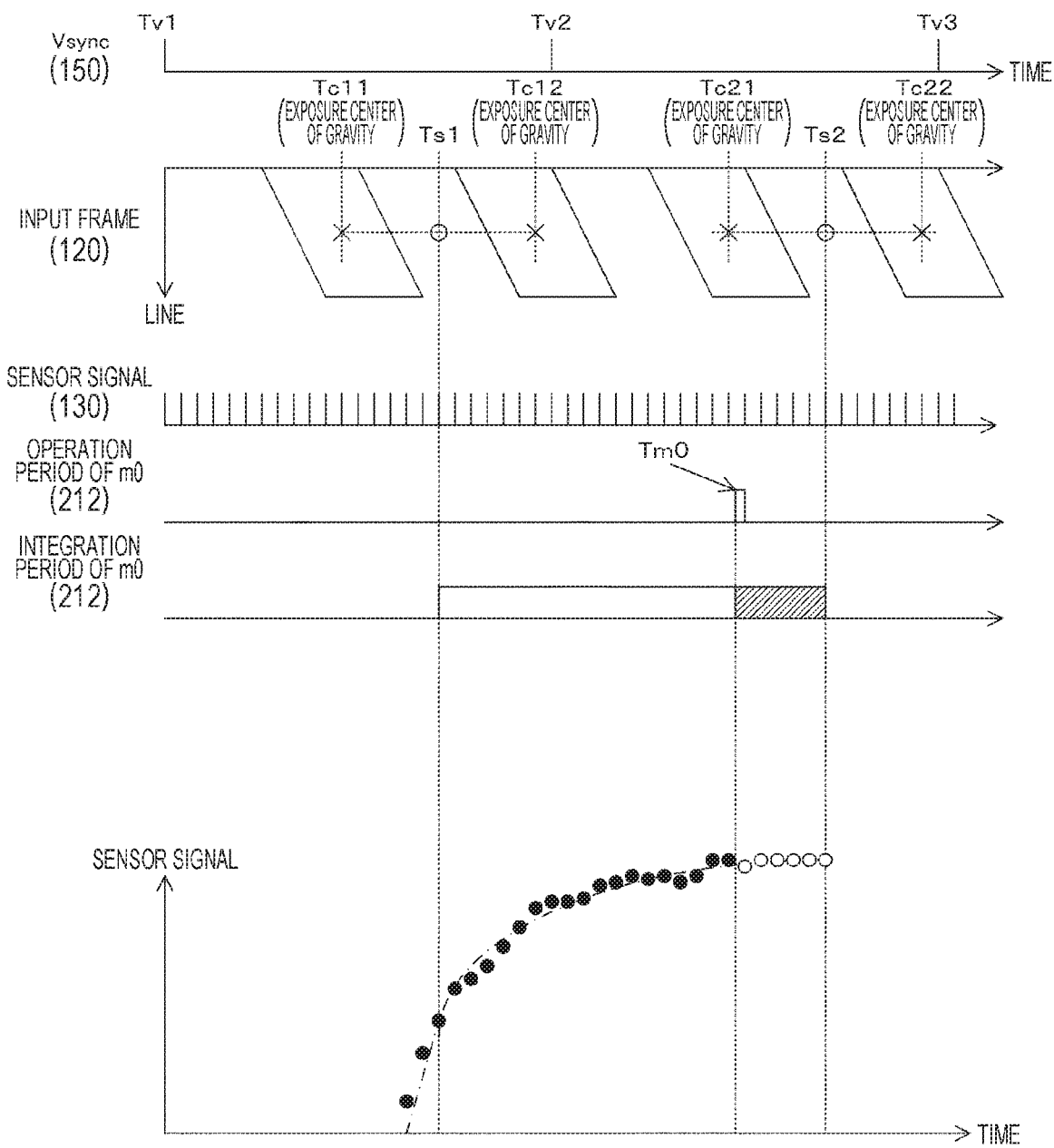
FIG. 6 is a diagram for explaining prediction operation in the embodiment of the present technology.

FIG. 6 is a diagram for explaining prediction operation in the embodiment. As described above, the motion amount between synthesis frames integrator 212 needs to start operation of the motion amount m0 at the timing Tm0 earlier than the end time (Ts2) of the integration period of the motion amount m0. Therefore, the motion amount within synthesis frame integrator 213 performs prediction operation of the motion amount within the period from the timing Tm0 to the starting point timing Ts2.

In the prediction operation, the m-th degree polynomial that fits best to the locus of the sensor signal up to the timing Tm0 is used. Black circles in the drawing indicate plots of actually measured sensor signals and open circles indicate plots of values operated from m-th degree polynomial.

Configuration Example of Correction Amount Operation Unit

Figure 7:
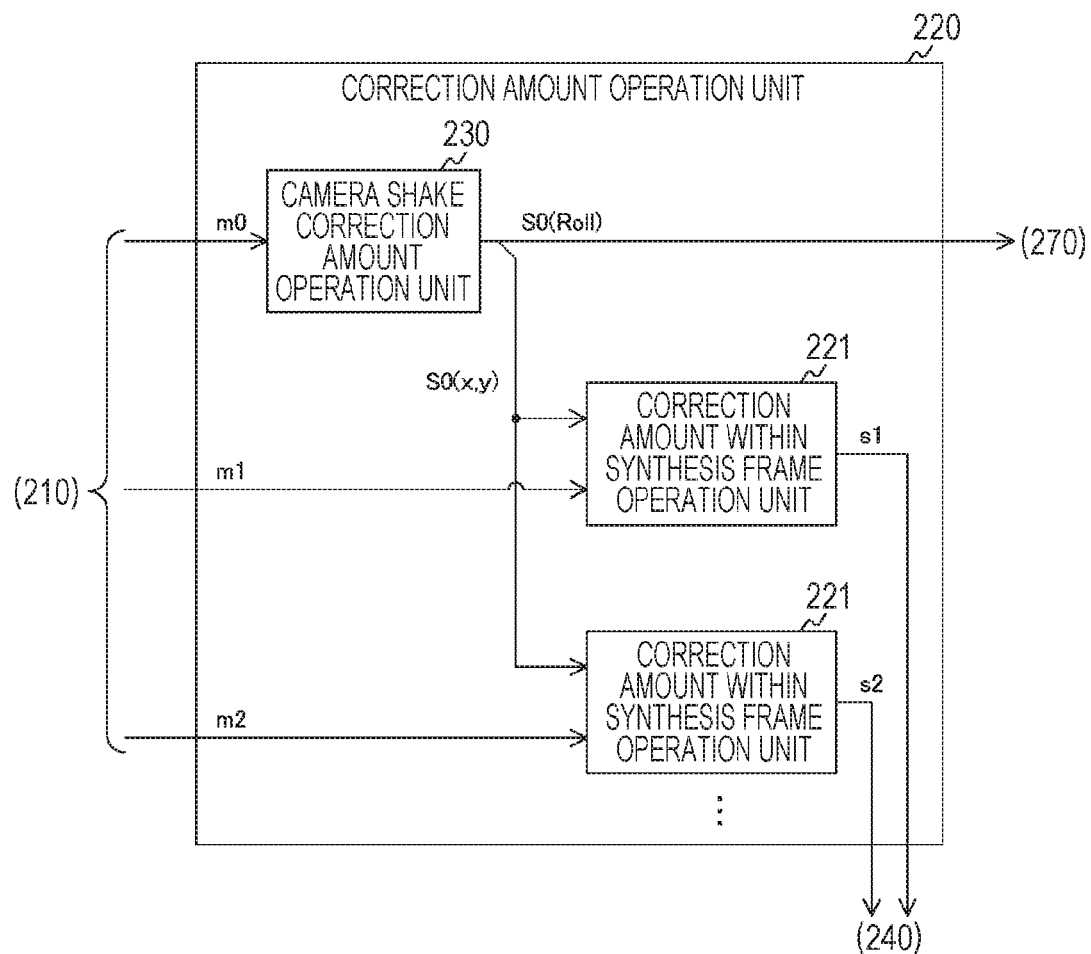
FIG. 7 is a block diagram showing a configuration example of a correction amount operation unit in the embodiment of the present technology.

FIG. 7 is a block diagram showing a configuration example of the correction amount operation unit 220 in the embodiment. The correction amount operation unit 220 includes a camera shake correction amount operation unit 230, and N correction amount within synthesis frame operation units 221.

The camera shake correction amount operation unit 230 operates a correction amount s0 in accordance with the motion amount between consecutive two synthesis frames from the motion amount m0. This motion amount s0 includes x-component, y-component, and roll angle component. The camera shake correction amount operation unit 230 supplies s0(x, y) that is the x-component and y-component of the motion amount s0 to the N correction amount within synthesis frame operation units 221. Furthermore, the camera shake correction amount operation unit 230 supplies s0(Roll) that is the roll angle component of the motion amount s0 to the rotation correction unit 270.

The correction amount within synthesis frame operation unit 221 operates a correction amount sn of the n-th frame of the N frames to be synthesized from the motion amount mn and the correction amount s0(x, y). This correction amount sn includes x-component, y-component, and roll angle component. The correction amount within synthesis frame operation unit 221, for example, converts the pitch angle component and the yaw angle component of the motion amount mn into x-component and y-component. Then, the correction amount within synthesis frame operation unit 221 operates the correction amount sn using the following equation and supplies a result to the cutout processing unit 240.

$$sn(x)=s0(x)+mn(x)$$

$$sn(y)=s0(y)+mn(y)$$

In the above equation, sn(x) is the x-component of the correction amount sn, and s0(x) is the x-component of the correction amount s0. Furthermore, mn(x) is the x-component of the motion amount mn. sn(y) is the y-component of the correction amount sn, and s0(y) is the y-component of the correction amount s0. Furthermore, mn(y) is the y-component of the motion amount mn.

Configuration Example of Camera Shake Correction Amount Operation Unit

Figure 8:
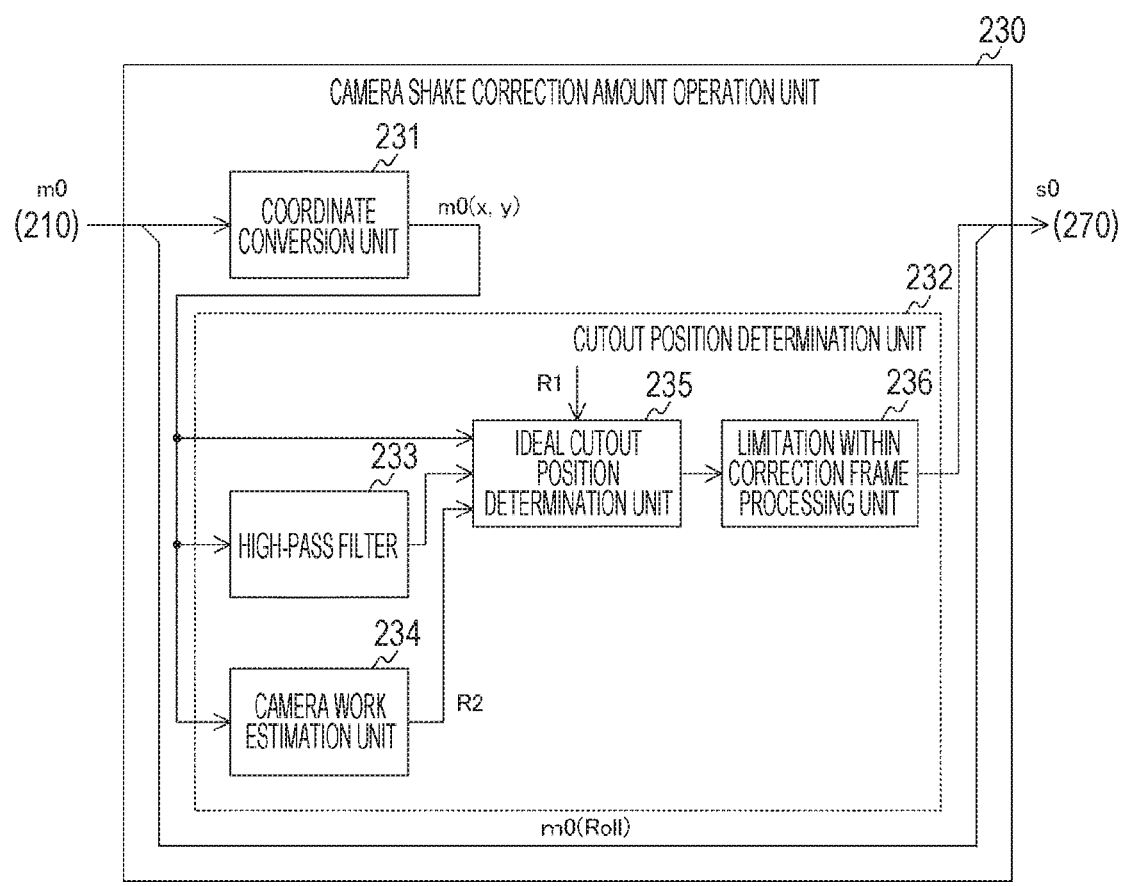
FIG. 8 is a block diagram showing a configuration example of a camera shake correction amount operation unit in the embodiment of the present technology.

FIG. 8 is a block diagram showing a configuration example of the camera shake correction amount operation unit 230 in the embodiment. The camera shake correction amount operation unit 230 includes a coordinate conversion unit 231, and a cutout position determination unit 232. The cutout position determination unit 232 includes a high-pass filter 233, a camera work estimation unit 234, an ideal cutout position determination unit 235, and a limitation within correction frame processing unit 236.

The coordinate conversion unit 231, for example, converts the pitch angle component and the yaw angle component of the motion amount m0 into x-component and y-component according to the following equation.

$$m0(x)=Lx \times \tan\{m0(Yaw)\}$$

$$m0(y)=Ly \times \tan\{m0(Pitch)\}$$

In the above equation, Lx and Ly are coefficients determined by a focal length of the lens. Furthermore, tan ( ) is a tangent function. m0(Yaw) is the yaw angle component of the motion amount m0, and m0(Pitch) is the pitch angle component of the motion amount m0.

The coordinate conversion unit 231 supplies the converted m0(x, y) to the high-pass filter 233, the camera work estimation unit 234, and the ideal cutout position determination unit 235.

The high-pass filter 233 passes a component having a frequency higher than a predetermined cutoff frequency in m0(x, y) as a high frequency-component HPF(m0). The high-pass filter 233 supplies the high-frequency-component HPF(m0) to the ideal cutout position determination unit 235.

The camera work estimation unit 234 estimates whether or not specific photographing operation (for example, panning photographing) has been performed by a photographer. The camera work estimation unit 234 generates a coefficient R2 indicating an estimation result and supplies the coefficient R2 to the ideal cutout position determination unit 235. This coefficient R2 is a real number of, for example, "0" to "1", and is set to be a value closer to "1" as operation is more similar to panning photographing.

The ideal cutout position determination unit 235 calculates the correction amount s0' using the following equation. This correction amount s0' includes x-component and y-component. The ideal cutout position determination unit 235 supplies the calculated correction amount s0' to the limitation within correction frame processing unit 236.

$$s'(k)=s0(k-1)+R1 \cdot \{HPF(m0)+R1 \cdot (1-R2) \cdot \{m0-HPF(m0)\}$$

In the above equation, R2 is a camera shake correction coefficient, and a real number of "0" to "1" is set. s0'(k) is the correction amount of the k-th frame, and s0'(k−1) is the correction amount s0 of the (k−1)-th frame. Among these, s'(k) is output as s0' of this time.

The limitation within correction frame processing unit 236 limits the position of the cutout region within a certain correction frame. For example, the size of the correction frame on the x-axis is ±cx, and the size of the correction frame on the y-axis is ±cy. The limitation within correction frame processing unit 236 performs limiting processing on the x-component and the y-component of the correction amount s0', the correction amount including the x-component and the y-component after the limitation processing, and the roll angle component m0(Roll) of the motion amount m0 is output as s0. s0(x, y) that is the x-component and y-component of this correction amount s0 is input to the N correction amount within synthesis frame operation units 221, and the remaining roll angle component s0(Roll) is input to the rotation correction unit 270.

Here, cx corresponds to sx−rx, cy corresponds to sy−ry. sx and sy are the size of the correction frame on the x-axis and the y-axis of the whole electronic camera shake correction. rx and ry are the size of the correction frame on the x-axis and the y-axis at the time of rotational correction, among the electronic camera shake correction.

Configuration Example of Cutout Processing Unit

Figure 9:
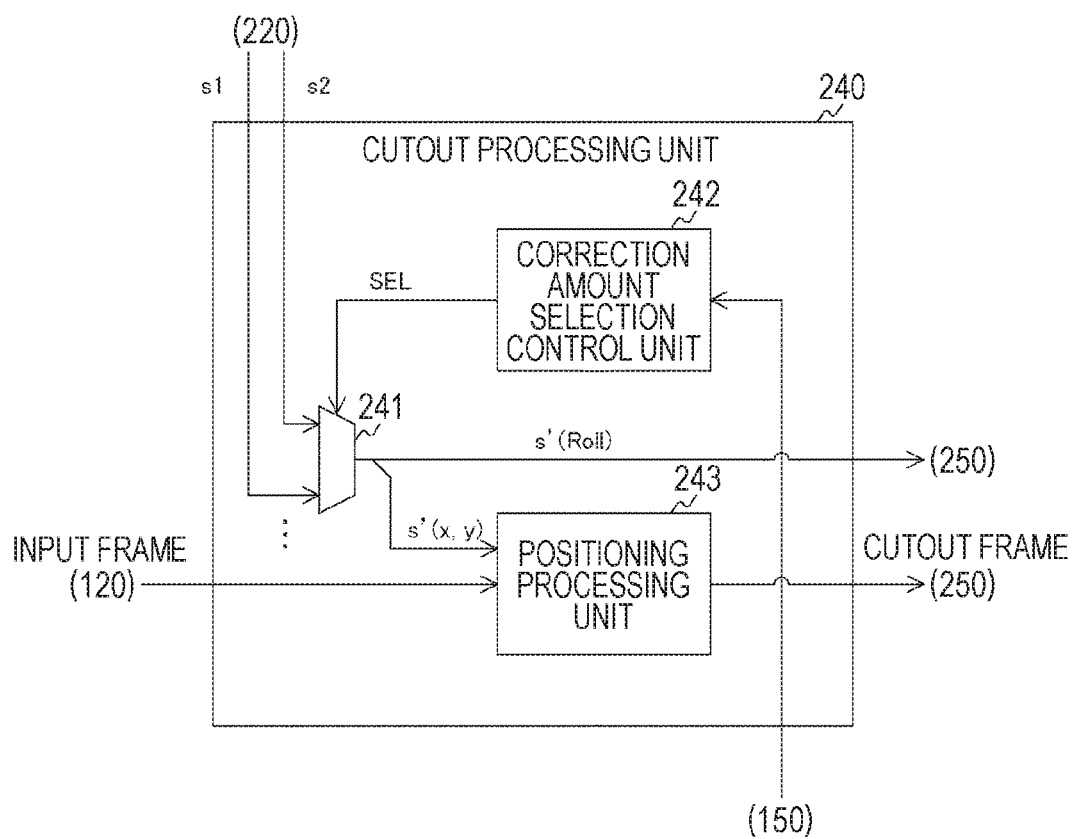
FIG. 9 is a block diagram showing a configuration example of a cutout processing unit in the embodiment of the present technology.

FIG. 9 is a block diagram showing a configuration example of the cutout processing unit 240 in the embodiment. The cutout processing unit 240 includes a selector 241, a correction amount selection control unit 242, and a positioning processing unit 243.

The correction amount selection control unit 242 supplies a selection signal SEL indicating any of the N correction amounts sn to the selector 241. The correction amount selection control unit 242 generates the selection signal SEL indicating the n-th correction amount when the n-th frame of the N frames is imaged on the basis of the timing signal from the control unit 150.

The selector 241 selects any of the N correction amounts sn according to the selection signal SEL. The selector 241 supplies s'(x, y) that is the x-component and y-component of the selected correction amount sn to the positioning processing unit 243, and supplies the remaining roll angle components s'(Roll) to the image synthesis unit 260 via the subject motion detection unit 250.

Each time an input frame is input, the positioning processing unit 243 corrects the position of the cutout region by the correction amount s'(x, y) in the input frame, and cut outs the cutout region after the correction. The positioning processing unit 243 supplies the cut out region to the subject motion detection unit 250 as a cutout frame.

Configuration Example of Subject Motion Detection Unit

Figure 10:
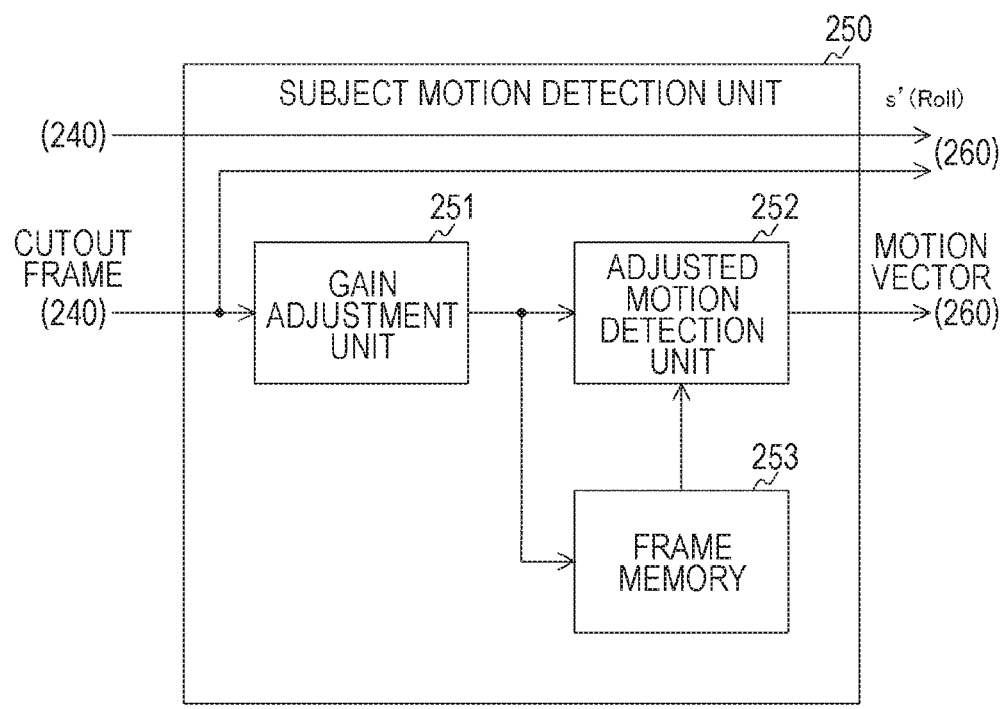
FIG. 10 is a block diagram showing a configuration example of a subject motion detection unit in the embodiment of the present technology.

FIG. 10 is a block diagram showing a configuration example of the subject motion detection unit 250. The subject motion detection unit 250 includes a gain adjustment unit 251, an adjusted motion detection unit 252, and a frame memory 253.

The gain adjustment unit 251 adjusts a pixel value with a predetermined gain in the cutout frame. The gain adjustment unit 251 supplies the adjusted cutout frame to the frame memory 253 and the adjusted motion detection unit 252. The frame memory 253 holds the cutout frame. Furthermore, the cutout frame before the gain adjustment is also supplied to the image synthesis unit 260 in addition to the gain adjustment unit 251.

The adjusted motion detection unit 252 detects the motion vector of the subject from the past cutout frames held in the frame memory 253 and the current cutout frame from the gain adjustment unit 251. The adjusted motion detection unit 252 supplies the detected motion vector to the image synthesis unit 260.

Configuration Example of Image Synthesis Unit

Figure 11:
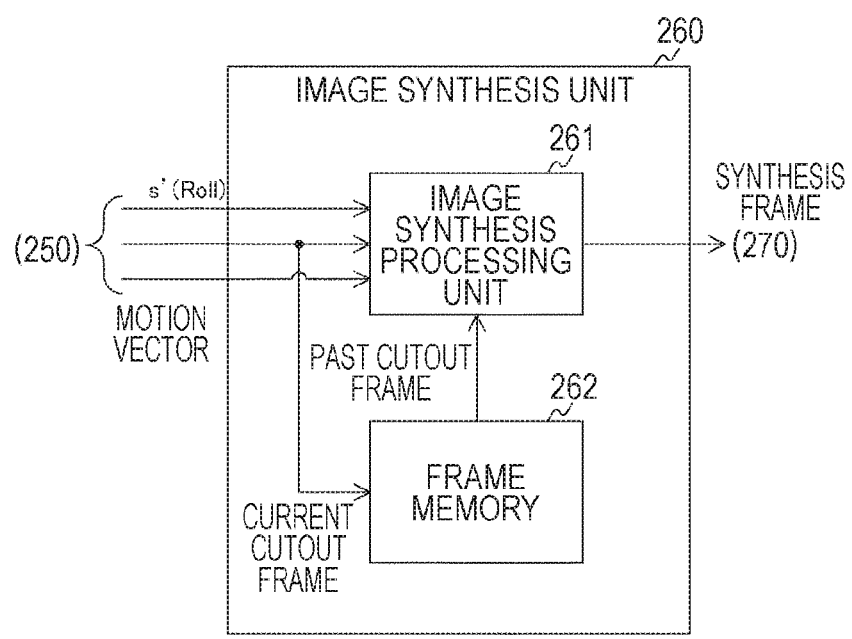
FIG. 11 is a block diagram showing a configuration example of an image synthesis unit in the embodiment of the present technology.

FIG. 11 is a block diagram showing a configuration example of the image synthesis unit 260 in the embodiment. The image synthesis unit 260 includes an image synthesis processing unit 261 and a frame memory 262.

The frame memory 262 holds N−1 cutout frames. The image synthesis processing unit 261 synthesizes the current cutout frame from the subject motion detection unit 250, and the past cutout frames held in the frame memory 262.

First, the image synthesis processing unit 261 translates a corresponding one of the N cutout frames to be synthesized that corresponds to the motion vector, on the basis of the motion vector detected by the subject motion detection unit 250, and performs positioning within a certain frame. Then, the image synthesis processing unit 261 determines an average value of corresponding pixel values in each of the N frames after positioning, and generates a synthesis frame including the pixel of the average value. With this processing, noise mixed in the video signal can be reduced. Such synthesis processing is called three-dimensional noise reduction. The image synthesis processing unit 261 supplies the synthesized frame to the rotation correction unit 270 as a synthesis frame. Note that that image synthesis processing unit 261 is an example of the synthesis processing unit described in the claims.

Note that the image synthesis unit 260 may perform synthesis processing (such as high dynamic range synthesis) other than the three-dimensional noise reduction. In the high dynamic range synthesis, the imaging element 120 images a plurality of cutout frames having different exposure times, and the image synthesis unit 260 adds corresponding pixel values in these frames to generate a synthesis frame. With this processing, the dynamic range can be enlarged than before the synthesis.

Figure 12:
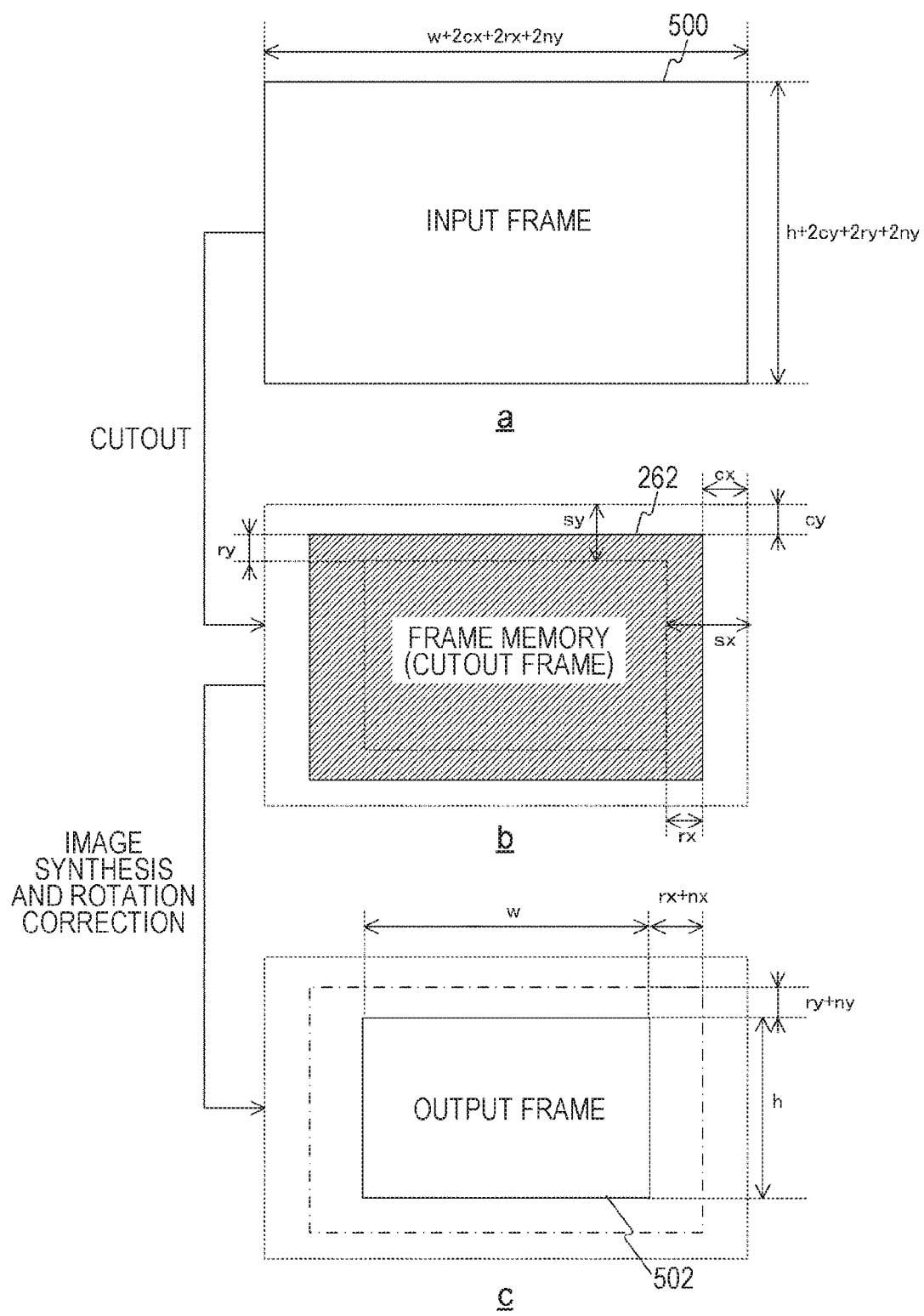
FIG. 12 is a diagram showing an example of respective sizes of an input frame, a cutout frame, and an output frame in the embodiment of the present technology.

FIG. 12 is a diagram showing an example of respective sizes of the input frame, the cutout frame, and the output frame in the embodiment. a in the drawing shows an example of the size of an input frame 500, and b in the drawing shows an example of a cutout frame held in the frame memory 262. The hatched portion of b in the drawing indicates the cutout frame in the frame memory 262. c in the drawing shows an example of an output frame 502.

A width W that is a length on the x-axis of the input frame 500 and a height H that is a length on the y-axis are expressed by the following equations.

$$W = w + 2cx + 2rx + 2nx \qquad \text{Equation 1}$$

$$H = h + 2cy + 2ry + 2ny \qquad \text{Equation 2}$$

$$cx = sx - rx \qquad \text{Expression 3}$$

$$cy = sy - ry \qquad \text{Equation 4}$$

By substituting Equation 3 and Equation 4 into Equation 1 and Equation 2, the following equation is obtained.

$$W = w + 2sx + 2nx$$

$$H = h + 2sx + 2ny$$

Here, w is the width of the output frame 502, and sx is the size of the correction frame on the x-axis in the cutout processing (in other words, camera shake correction) by the cutout processing unit 240. rx is the size of the correction frame on the x-axis in the rotation correction by the rotation correction unit 270. nx is the size of the frame on the x-axis used for positioning at the time of synthesis by the image synthesis unit 260. h is the height of the output frame 502, and sy is the size of the correction frame on the y-axis in camera shake correction. rx is the size of the correction frame on the y-axis in the rotation correction. ny is the size of the frame on the y-axis used for positioning at the time of synthesis.

In the input frame 500, a cutout region having a width of W−2cx and a height of H−2cy is provided. In accordance with the motion of the imaging apparatus 100, the cutout processing unit 240 translates the cutout region within the correction frame of sx and sy size, cuts out the cutout region after the translation, and outputs the cutout region as a cutout frame. This cutout frame is held in the frame memory 262.

Subsequently, the image synthesis unit 260 performs positioning within the frame of nx, ny to synthesize two cutout frames. Then, the rotation correction unit 270 rotates the synthesis frame within the correction frame of rx, ry to generate an output frame 502.

Figure 13:
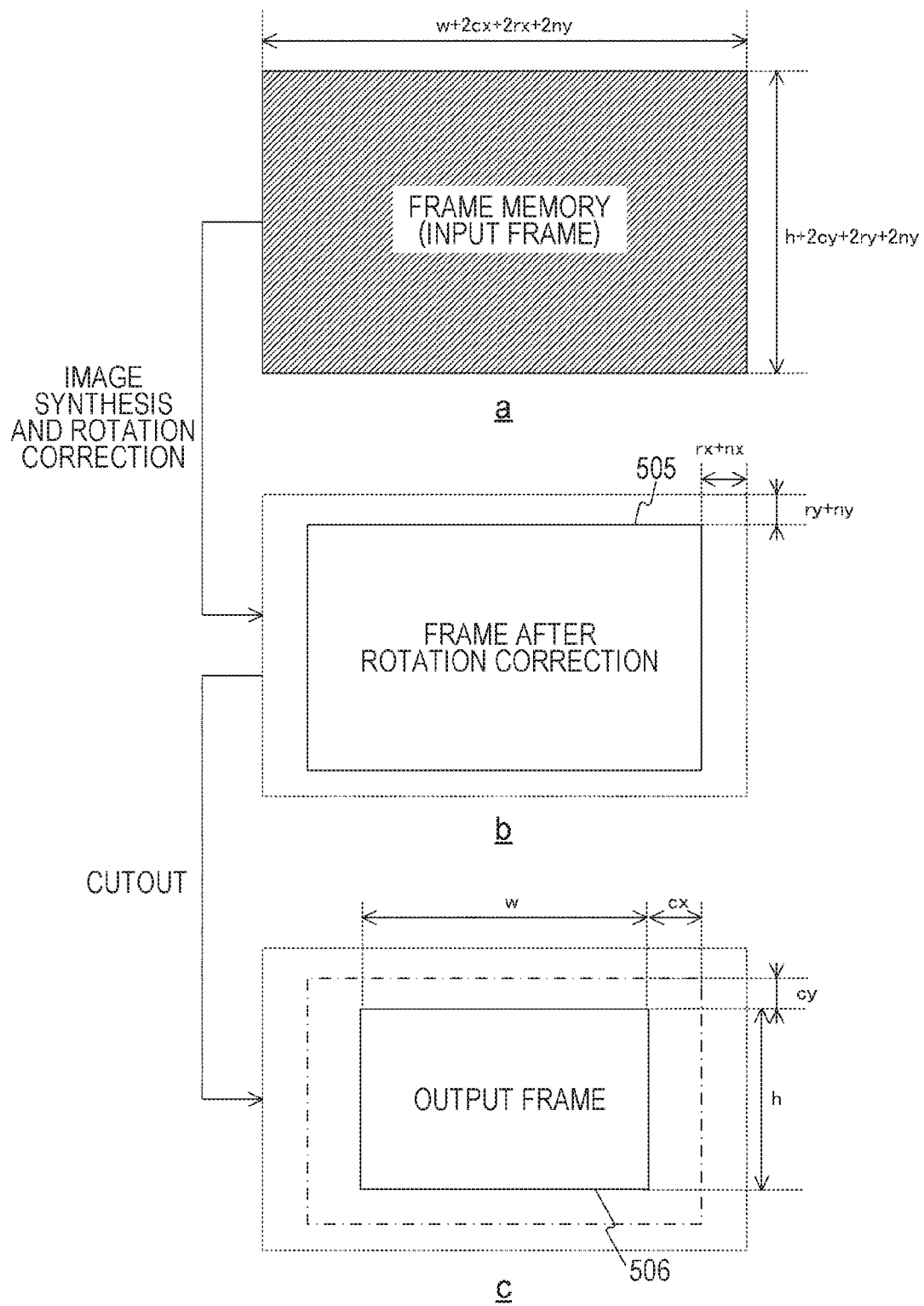
FIG. 13 is a diagram showing an example of respective sizes of an input frame, a frame after rotation correction, and an output frame in a comparative example.

FIG. 13 is a diagram showing an example of respective sizes of an input frame, a frame after rotation correction, and an output frame in a comparative example. In this comparative example, it is assumed that the imaging apparatus performs the camera shake correction (cutout processing) after sequentially performing the synthesis processing and rotation correction. a in the drawing shows an example of the size of the input frame, and b in the drawing shows an example of the frame 505 after the rotation correction. The hatched portion of a in the drawing indicates an input frame in the frame memory. c in the drawing shows an example of the output frame 506.

The imaging apparatus of the comparative example holds the input frame as it is in the frame memory in synthesis. The size of this input frame is expressed by Equation 1 and Equation 2. Then, the imaging apparatus synthesizes the past frame held in the frame memory and the current frame and performs the rotation correction. Through these processes, a synthesis frame 505 having a width of W−2rx−2nx and a height of H−2ry−2rn is generated. Finally, the imaging apparatus cuts out the cutout frame within the correction frame in accordance with the motion of the imaging apparatus to generate the output frame 506.

As described above, in the comparative example in which the cutout processing is performed after the synthesis processing, the capacity of the frame memory required for the synthesis must be equal to or larger than the data amount of the input frame before the cutout.

On the other hand, in the imaging apparatus 100, as exemplified in FIG. 12, since the cutout processing is performed before the synthesis processing, the capacity of the frame memory 262 can be equal to or larger than the data amount of the cutout frame after the cutout. Therefore, as compared to the comparative example, the capacity of the frame memory required for the synthesis can be reduced. With this configuration, the amount of calculation at the time of synthesis processing and the cost of the imaging apparatus can be reduced.

Example of Operation of Imaging Apparatus

Figure 14:
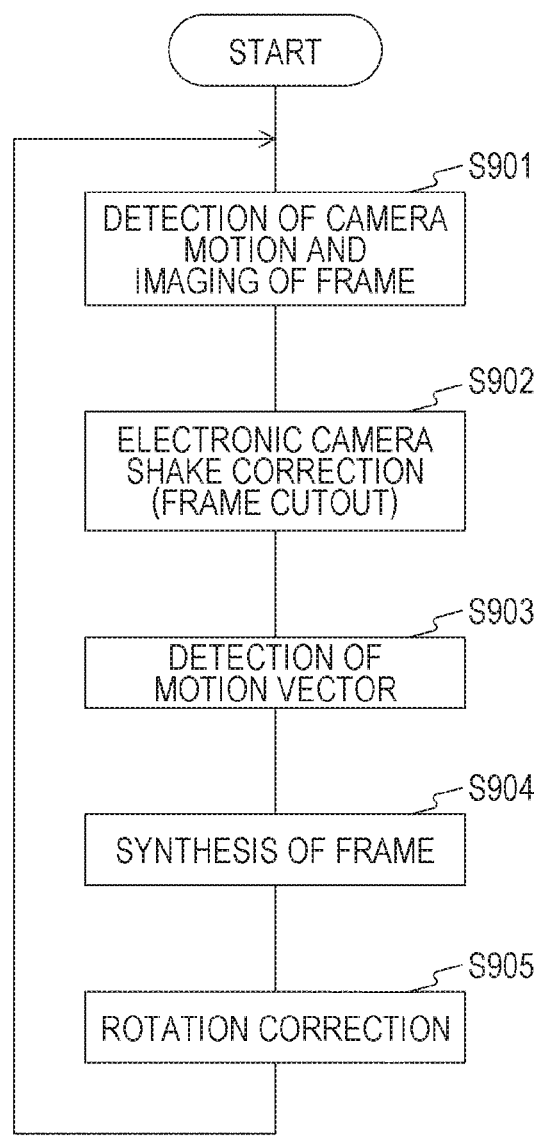
FIG. 14 is a flowchart showing an example of operation of the imaging apparatus in the embodiment of the present technology.

FIG. 14 is a flowchart showing an example of the operation of the imaging apparatus 100 in the embodiment. This operation is started when, for example, operation for starting imaging of a moving image or a still image (pressing of an imaging button, or the like) is performed.

The imaging apparatus 100 images a frame while detecting its own motion (step S901). Then, the imaging apparatus 100 performs electronic camera shake correction for cutting out a part of the frame on the basis of its own motion (step S902).

Subsequently, the imaging apparatus 100 compares a plurality of consecutive cutout frames to detect a motion vector of the subject (step S903). Then, the imaging apparatus 100 performs positioning on the basis of the motion vector, and synthesizes N cutout frames (step S904). Then, the imaging apparatus 100 performs the rotation correction with respect to the synthesis frame to generate an output frame (step S905). After step S905, the imaging apparatus 100 repeatedly performs step S901 and the subsequent steps.

As described above, according to the embodiment of the present technology, since the imaging apparatus 100 cuts out a part of the frame, and then, holds the part in the frame memory 262 for synthesis, the capacity of the frame memory 262 can be suppressed to a data amount of the cutout frame.

2. First Modification

In the above-described embodiment, the imaging apparatus 100 performs the rotation correction, but in this configuration, the capacity of the frame memory 262 increases by the size of the correction frame in the rotation correction. The imaging apparatus 100 according to the first modification of this embodiment is different from the embodiment in that the capacity of the frame memory 262 is further reduced.

Figure 15:
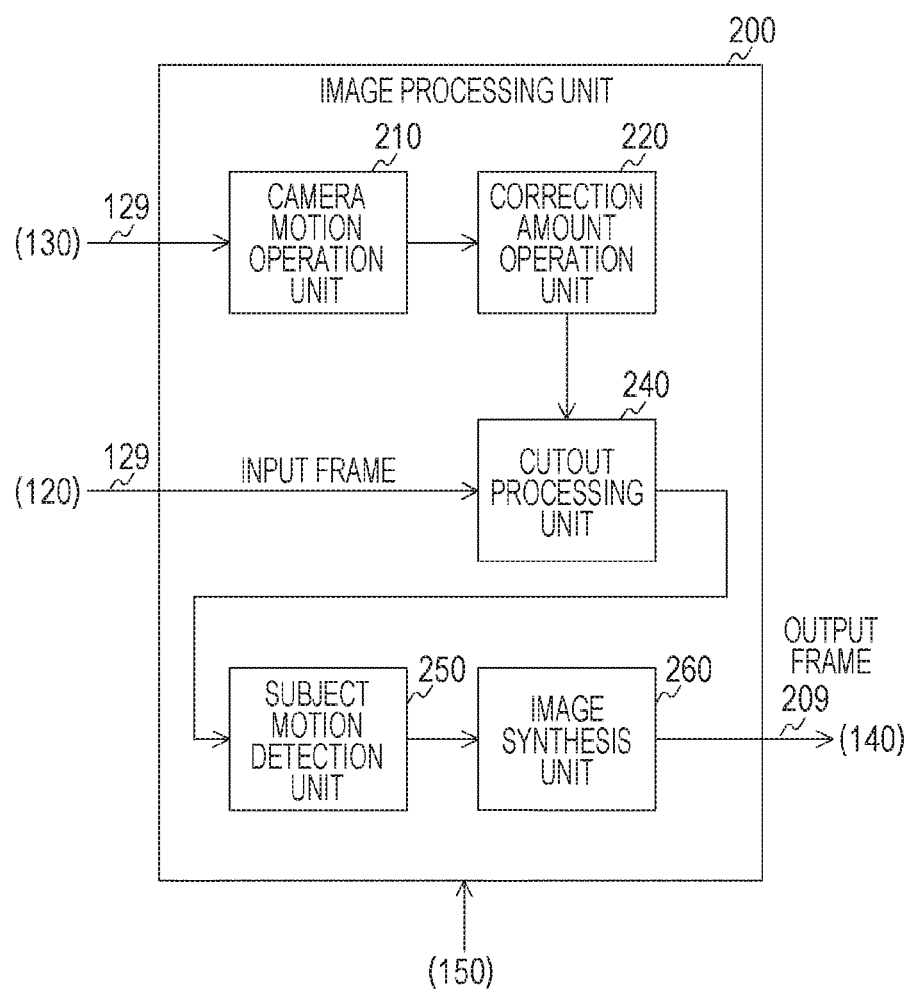
FIG. 15 is a block diagram showing a configuration example of an image processing unit in a first modification of the embodiment of the present technology.

FIG. 15 is a block diagram showing a configuration example of the image processing unit 200 in the first modification of the embodiment. The image processing unit 200 of the first modification is different from the embodiment in that the rotation correction unit 270 is not included. The image synthesis unit 260 of the first modification outputs the synthesis frame as an output frame.

As described above, according to the first modification of the embodiment of the present technology, since the imaging apparatus 100 does not perform rotation correction on the synthesis frame, the capacity of the frame memory 262 can be reduced for the amount of the correction frame of the rotation correction.

3. Second Modification

In the above-described embodiment, the imaging apparatus 100 performs rotation correction and detection of the motion vector of the subject. However, in this configuration, the capacity of the frame memory 262 is increased for the amount of the size of the frame in the rotation correction and the synthesis processing. The imaging apparatus 100 according to the first modification of this embodiment is different from the embodiment in that the capacity of the frame memory 262 is further reduced.

Figure 16:
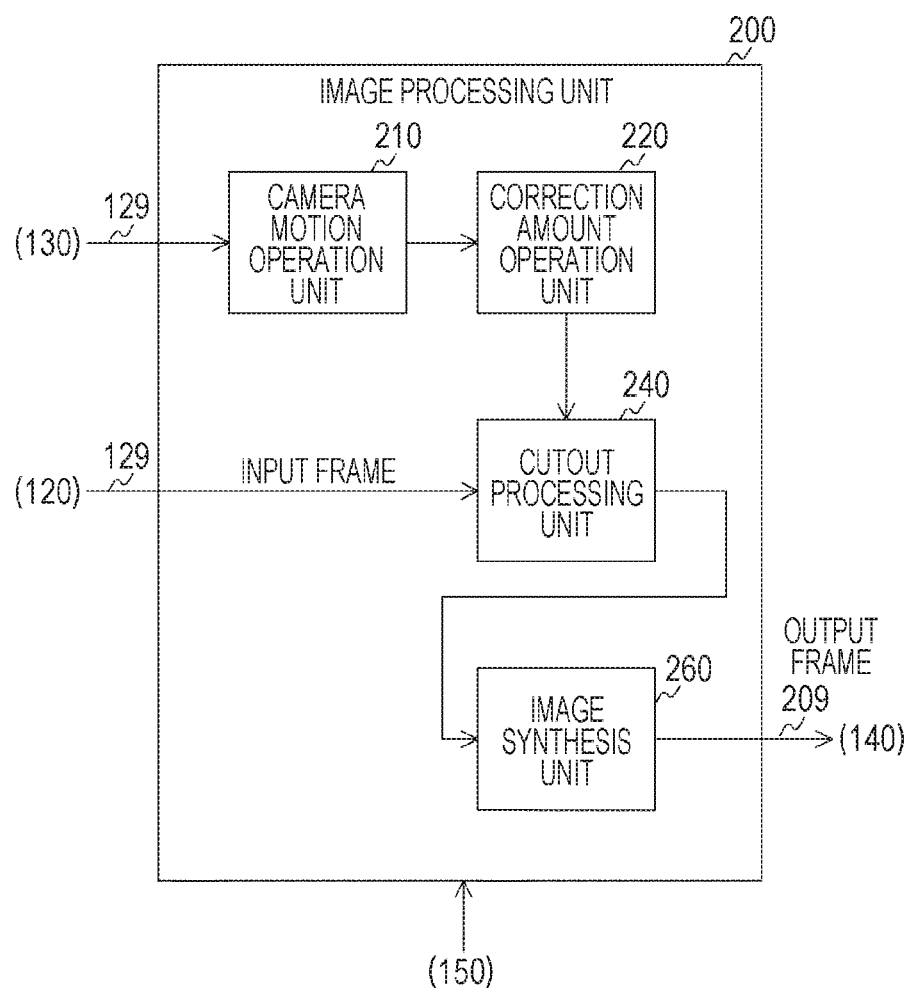
FIG. 16 is a block diagram showing a configuration example of an image processing unit in a second modification of the embodiment of the present technology.

FIG. 16 is a block diagram showing a configuration example of the image processing unit 200 in the first modification of the embodiment. The image processing unit 200 of the first modification is different from the embodiment in that the subject motion detection unit 250 and the rotation correction unit 270 are not included. The cutout processing unit 240 of the first modification supplies the cutout frame to the image synthesis unit 260, and the image synthesis unit 260 outputs the synthesis frame as an output frame.

FIG. 17 is a diagram summarizing the respective effects of the above-described embodiment, the first and second modifications, and the comparative example. Since the imaging apparatus 100 of the embodiment detects the motion vector of the subject, the effect of the image quality improvement by the image synthesis is increased. Furthermore, since the imaging apparatus 100 of the embodiment performs the rotation correction, the effect of the image quality improvement by the electronic camera shake correction is increased.

On the other hand, in the first modification, since the rotation correction is not performed, the effect of the image quality improvement by the electronic camera shake correction is reduced. Furthermore, in the second modification, since the motion vector of the subject is not detected, the effect of the image quality improvement by the image synthesis is also reduced. Furthermore, in the comparative example, since the motion vector of the subject is detected and the rotation correction is performed, the effect of the image quality improvement by image synthesis and electronic camera shake correction is increased.

FIG. 18 is a diagram for comparing frame memory usage at the time of synthesis processing in each of the embodiment, the first and second modifications, and the comparative example. The size $S_{inc}0$ of the frame to be synthesized in the embodiment is expressed by the following equation.

$$S_{inc}0=(w+2rx+2nx)\times(h+2ry+2ny)$$

The size $S_{outc}0$ of the synthesized frame (synthesis frame) in the embodiment is expressed by the following equation.

$$S_{outc}0=r1^2\times(w+2rx+2nx)\times(h+2ry+2ny)$$

In the above equation, r1 indicates the reduction rate of the width or the height of the size of the target frame of the motion detection with respect to the cutout frame before the synthesis. Here, the target frame of the motion detection is a frame to be a target of the above-described subject motion detection using the block matching method or the like. Reducing the frame and performing the motion detection as described above is for reducing the calculation cost. Note that, in the synthesis, this reduced frame is not used, and N cutout frames are synthesized on an equal scale.

The use amount $S_{mc}0$ required for the cutout frame of the frame memory 262 in the embodiment is expressed by the following equation.

$$S_{mc}0=\{(N-1)+r1^2\}\times(w+2rx+2nx)\times(h+2ry+2ny)$$

Next, in the first modification, the size $S_{inc}1$ of the frame to be synthesized is expressed by the following equation.

$$S_{inc}1=(w+2nx)\times(h+2ny)$$

The size $S_{outc}1$ of the synthesized frame in the first modification is expressed by the following equation.

$$S_{outc}1=r1^2\times(w+2nx)\times(h+2ny)$$

The use amount $S_{mc}1$ of the frame memory 262 in the first modification is expressed by the following equation.

$$S_{mc}1=\{(N-1)+r1^2\}\times(w+2nx)\times(h+2ny)$$

Furthermore, in the second modification, the size $S_{inc}2$ of the frame to be synthesized is the same as $S_{inc}1$ of the first modification.

The use amount $S_{inc}2$ of the frame memory in the second modification is expressed by the following equation.

$$S_{mc}2=(N-1)\times(w+2nx)\times(h+2ny)$$

On the other hand, the size $S_{inc}S$ of the frame to be synthesized in the comparative example is expressed by the following equation.

$$S_{inc}S=(w+2sx+2nx)\times(h+2sy+2ny)$$

Furthermore, the size $S_{cc}S$ of the synthesized frame in the comparative example is expressed by the following equation.

$$S_{outc}S=r1^2\times(w+2sx+2nx)\times(h+2sy+2ny)$$

Furthermore, the use amount $S_{inc}S$ of the frame memory in the comparative example is expressed by the following equation.

$$S_{mc}S=\{(N-1)+r1^2\}\times(w+2sx+2nx)\times(h+2sy+2ny)$$

FIG. 19 is a diagram for comparing frame memory usage at the time of camera shake correction in each of the embodiment, the first and second modifications, and the comparative example of the present technology. The size $S_{ins}0$ of the target frame of the camera shake correction in the embodiment is similar to $S_{inc}S$. Furthermore, the use amount $S_{ms}0$ of the frame memory at the time of camera shake correction in the embodiment is expressed by the following equation.

$$S_m0=(w+2rx)\times(h+2ry)$$

Next, the size of the target frame of the camera shake correction in the first and second modifications is similar to the size of $S_{inc}0$ in the embodiment.

On the other hand, the size $S_{ins}S$ of the target frame of the camera shake correction in the comparative example is expressed by the following equation. Furthermore, the use amount $S_{ms}S$ of the frame memory at the time of camera shake correction in the comparative example is similar to $S_{ins}S$.

$$S_{ins}S=(w+2sx)\times(h+2sy)$$

FIG. 20 is a diagram for comparing frame memory usage at the time of camera shake correction of N=2 in each of the embodiment, the first and second modifications, and the comparative example of the present technology. The reduction ratio r1 is set to 0.5, and the reduction ratio r2 is set to 0.25. Furthermore, the ratio of sx, sy, cx, cy, rx, ry, nx, ny, w and h with respect to the width W and the height H of the input frame is set as follows.

W:sx=100%:10%
H:sy=100%:10%
W:cx=100%:8%
H:cy=100%:5%
W:rx=100%:2%
H:ry=100%:5%
W:nx=100%:2%
H:ny=100%:2%
W:w=100%:76%
H:h=100%:76%

Using these setting values and the relational expression exemplified in FIG. 18, the frame size to be synthesized, the range to be reduced by the synthesis and the use amount of the frame memory in the embodiment, the first and second modifications, and the comparative example. As a result, assuming that the use amount of the frame memory of the comparative example is 1.250, the use amount of the embodiment may be 0.945, and the capacity of the frame memory can be reduced. Furthermore, the use amount may be 0.800 in the first modification and 0.640 in the second modification, and the capacity of the frame memory can be further reduced.

Figures 21, 22:
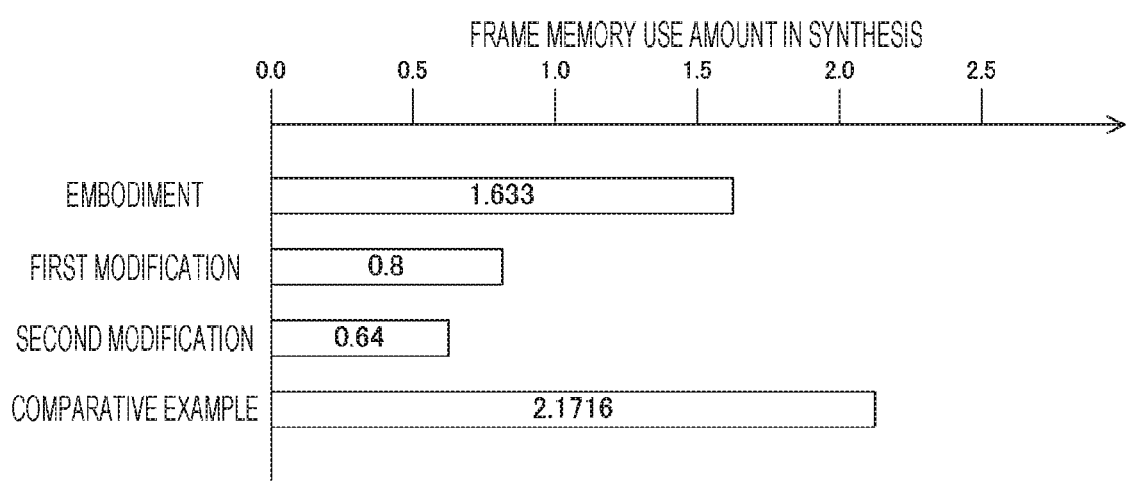
FIG. 21 is a specific example of frame memory use amounts at the time of camera shake correction of N=2 in each of the embodiment, the first and second modifications, and the comparative example of the present technology.
FIG. 22 is a graph showing frame memory use amounts at the time of synthesis processing of N=2 in each of the embodiment, the first and second modifications, and the comparative example of the present technology.

FIG. 21 is a specific example of frame memory use amount at the time of camera shake correction of N=2 in each of the embodiment, the first and second modifications, and the comparative example. The various conditions are similar to the case of FIG. 20. Assuming that the use amount of the frame memory of the comparative example is 0.9216, the use amount of the embodiment may be 0.6880, and the capacity of the frame memory can be reduced.

FIG. 22 is a graph showing a frame memory use amount at the time of synthesis processing of N=2 in the embodiment, the first and second modifications, and the comparative example. In this case, the result obtained in FIG. 20 is normalized by the size of the imaging frame. As illustrated in FIG. 22, the use amount of the frame memory of the embodiment is smaller than that of the comparative example, and the first and second use amounts are even smaller.

Figures 23, 24:
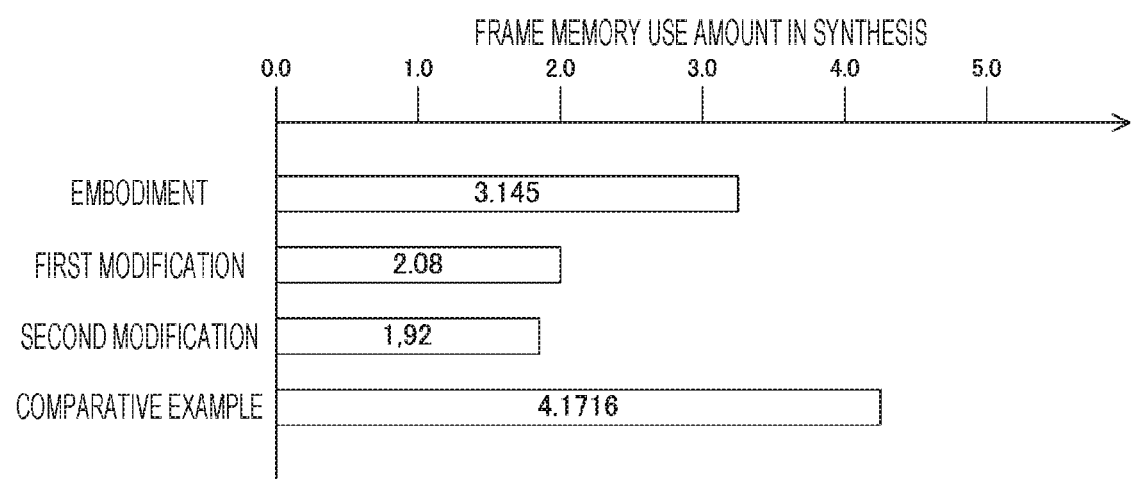
FIG. 23 is a specific example of frame memory use amounts at the time of synthesis processing of N=4 in each of the embodiment, the first and second modifications, and the comparative example of the present technology.
FIG. 24 is a graph showing frame memory use amounts at the time of synthesis processing of N=4 in each of the embodiment, the first and second modifications, and the comparative example of the present technology.

FIG. 23 is a specific example of the frame memory use amount at the time of synthesis processing of N=4 in the embodiment, the first and second modifications, and the comparative example. The various conditions other than the number N of frames to be synthesized are similar to the case of FIG. 20. As illustrated in the drawing, the use amount of the frame memory of the embodiment is smaller than that of the comparative example, and the first and second use amounts are even smaller.

FIG. 24 is a graph showing a frame memory use amount at the time of synthesis processing of N=2 in the embodiment, the first and second modifications, and the comparative example of the present technology. In this case, the result obtained in FIG. 23 is normalized by the size of the imaging frame.

FIG. 25 is a diagram for comparing a calculation amount at the time of subject motion detection of N=2 in each of the embodiment, the first and second modifications, and the comparative example. It is assumed that motion detection is performed by block matching. A granularity of the motion detection at the time of the synthesis processing is defined as s1, and a granularity of the motion detection at the time of the electronic camera shake correction is defined as s2. Here, the granularity indicates the ratio of the total of the coordinates in which block matching is performed, with respect to the entire frame. For example, when block matching is performed on all coordinates of a frame, the granularity is 100%. Furthermore, in a case where the block matching is performed by skipping one pixel in the x-axis direction and the y-axis direction, the granularity is 25%. Furthermore, detection frame sizes at the time of the camera motion detection in the comparative example are defined as px and py. Furthermore, the detection frame sizes at the time of the subject motion vector detection in the embodiment, the first and second modifications and the comparative example are defined as qx and qy.

The frame size $S_{inm}0$ of the subject motion detection target in the embodiment is similar to $S_{outc}0$. Furthermore, a detection range of the subject motion detection in the embodiment is (2qx)×(2qy). Furthermore, the calculation amount Q0 of the subject motion detection processing in the embodiment is expressed by the following equation.

$$Q0=(N-1)\times r1^2\times(w+2rx+2nx)\times(h+2ry+2ny)\times s1^2\times 2qx\times 2qy$$

Next, the frame size $S_{inm}1$ of the subject motion detection target in the first modification is similar to $S_{outc}1$. Furthermore, a detection range of the subject motion detection of the first modification is (2qx)×(2 qy). Furthermore, the calculation amount Q1 of the subject motion detection processing of the first modification is expressed by the following equation.

$$Q1=(N-1)\times r1^2\times(w+2nx)\times(h+2ny)\times s1^2 x2qx\times 2qy$$

On the other hand, the frame size $S_{inm}0$ of the subject motion detection target in the comparative example is similar to $S_{outc}S$. Furthermore, a detection range of the subject motion detection in the comparative example is (2px+2qx)×(2py+2qy). Furthermore, a calculation amount QS of the subject motion detection processing in the comparative example is expressed by the following equation.

$$QS=(N-1)\times r1^2\times(w+2sx+2nx)\times(h+2sy+2ny)\times s1^2\times (2px+2qx)\times(2py+2qy)$$

FIG. 26 is a specific example of the calculation amount at the time of subject motion detection of N=2 in each of the embodiment, the first and second modifications, and the comparative example. Using similar various conditions to those in FIG. 20 and the relational expression exemplified in FIG. 25, in the embodiment, the first and second modifications, and the comparative example, the frame size, the detection range, and the calculation amount of the detection target at the time of subject motion detection are determined. However, both the particle sizes s1 and s2 are set to 0.125. Furthermore, the ratios of px, py, qx, and qy to "W" and "H" are set as follows.

W:px=100%:3%
H:py=100%:5%
W:qx=100%:3%
H:qy=100%:5%

Assuming that the calculation amount of the comparative example is 9.375E-05, the calculation amount of the embodiment decreases to 2.025E-05. Furthermore, the calculation amount of the first modification is 1.500E-05, and decreases further.

Figures 27, 28:
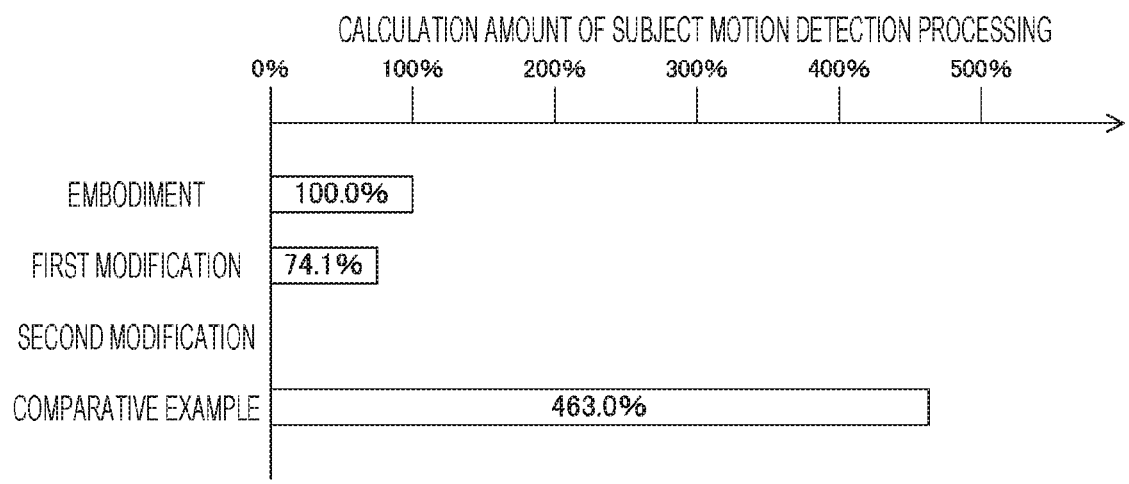
FIG. 27 is a graph showing the calculation amounts at the time of subject motion detection of N=2 in each of the embodiment, the first and second modifications, and the comparative example of the present technology.
FIG. 28 is a specific example of calculation amounts at the time of subject motion detection of N=4 in each of the embodiment, the first and second modifications, and the comparative example of the present technology.

FIG. 27 is a graph showing the calculation amount at the time of subject motion detection of N=2 in each of the embodiment, the first and second modifications, and the comparative example. In FIG. 27, the calculation result of FIG. 26 is normalized by the calculation amount of the embodiment.

FIG. 28 is a specific example of the calculation amount at the time of subject motion detection of N=4 in each of the embodiment, the first and second modifications, and the comparative example. The various conditions other than N are similar to the case of FIG. 26. Assuming that the calculation amount of the comparative example is 2.813E-04, the calculation amount of the embodiment is 6.075E-05. Furthermore, the calculation amount of the first modification is 4.500E-05.

As described above, according to the second modification of the embodiment of the present technology, since the imaging apparatus 100 does not perform detection of motion vectors and rotation correction, the capacity of the frame memory 262 can be reduced for the amount of frames in the synthesis processing and the rotation correction. Furthermore, the calculation amount at the time of subject motion detection can be reduced.

4. Third Modification

In the above-described embodiment, the imaging apparatus 100 predicts own motion amount within a predetermined prediction period and performs electronic camera shake correction on the basis of the motion amount. However, the longer the prediction period is, the prediction accuracy of the motion amount is reduced more, and the image quality after the electronic camera shake correction is reduced more. The imaging apparatus 100 according to the third modification of this embodiment is different from the embodiment in that the prediction accuracy of the motion amount of the imaging apparatus 100 is improved.

Figure 29:
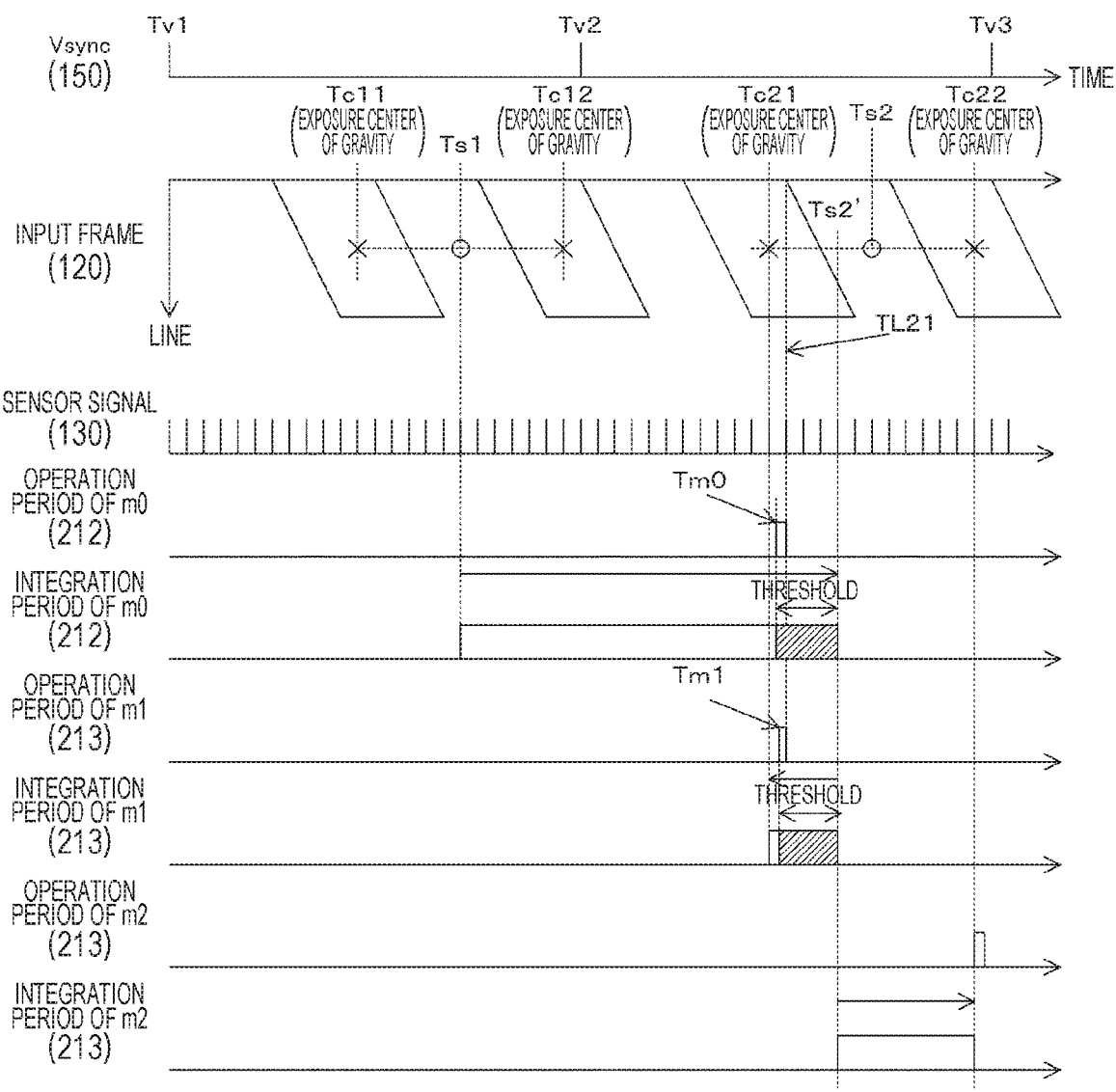
FIG. 29 is a timing chart showing an example of operation of a camera motion operation unit in the case of N=2 in a third modification of the embodiment of the present technology.

FIG. 29 is a timing chart showing an example of operation of the camera motion operation unit in the case of N=2 in a third modification of the embodiment. In this third modification, the length of the prediction period is limited to equal to or shorter than a predetermined threshold such that the prediction accuracy is equal to or higher than an allowable value. In a case where either the period from the start timing Tm0 to the starting point timing Ts2, and the period from the start timing Tm1 to the starting point timing Ts2 exceeds a threshold, the timing Ts2' that is closer to Tc21 than Ts2 is used as the starting point. In this case, the period from the start timing Tm0 or Tm1 to the starting point timing Ts2' is the prediction period. The starting point timing Ts2' is a timing at which the prediction period is equal to or shorter than the threshold.

By limiting the prediction period to the threshold or shorter as described above, the prediction accuracy can be improved as compared with the embodiment. However, on the other hand, the accuracy of electronic camera shake correction with respect to the synthesis frame is reduced. This is because a partition of the timing of the camera shake correction is temporarily assumed as Ts2, under the assumption that the image synthesis unit 260 synthesizes two frames with the same extent of ratio. The threshold is set in consideration of a balance between improvement in the prediction accuracy and reduction in the accuracy of electronic camera shake correction.

Figure 30:
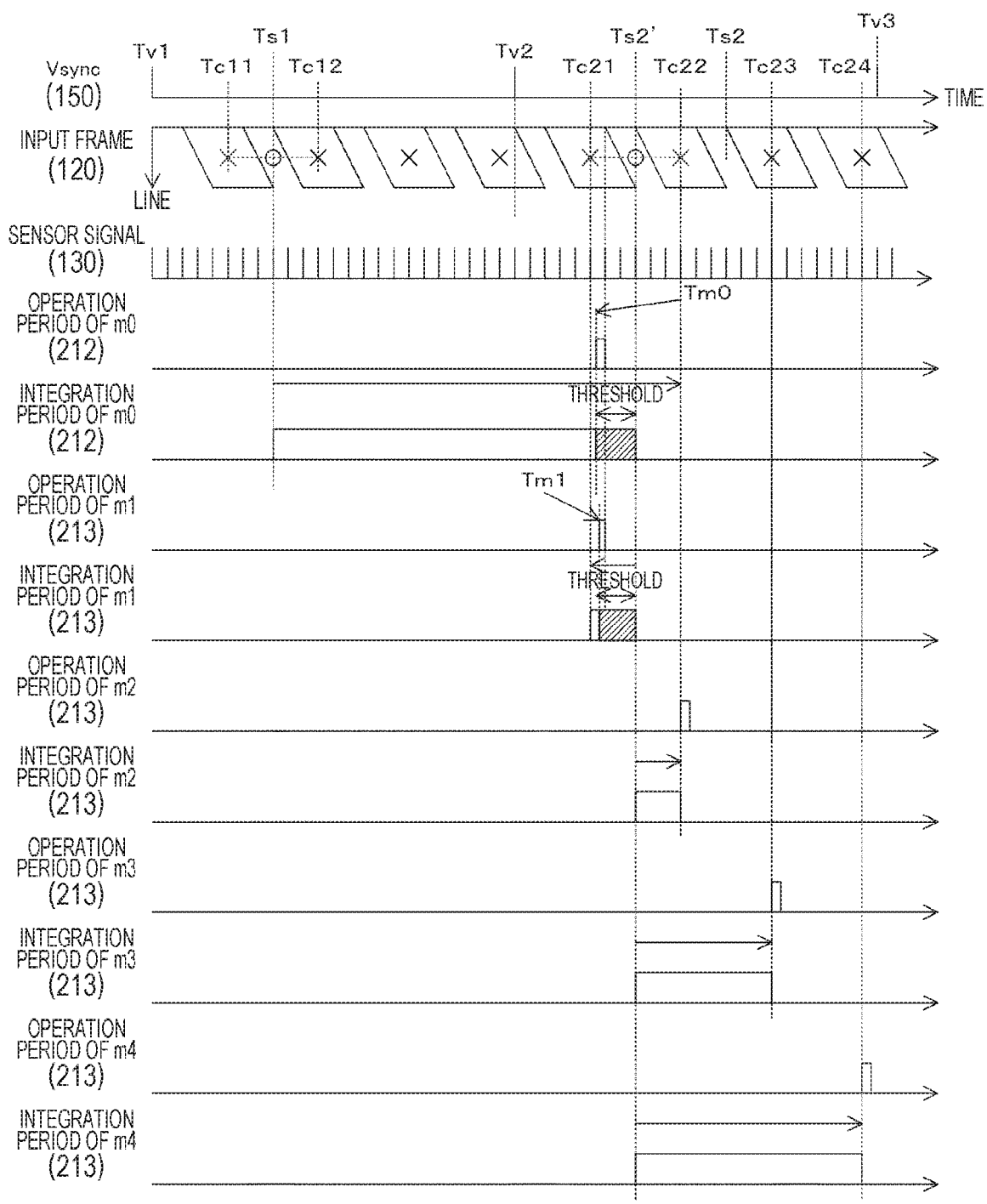
FIG. 30 is a timing chart showing an example of operation of the camera motion operation unit in the case of N=4 in the third modification of the embodiment of the present technology.

FIG. 30 is a timing chart showing an example of operation of the camera motion operation unit in the case of N=4 in a third modification of the embodiment. As in the case of N=2, the period from Tm0 or Tm1 to Ts2' is the prediction period, and the integration period corresponding to the second frame is from Ts2' to Tc22. Furthermore, the integration period corresponding to the third frame is from Ts2' to the timing Tc23 of the exposure center of gravity of the third frame, and the integration period corresponding to the fourth frame is from Ts2' to the timing Tc24 of the exposure center of gravity of the fourth frame.

As described above, according to the third modification of the embodiment of the present technology, since the prediction period for predicting the motion amount of the imaging apparatus 100 is limited to be equal to or shorter than the threshold, the prediction accuracy of the motion amount can be improved.

Note that the above-described embodiment shows an example for embodying the present technology, and matters in the embodiment and invention specifying matters in the claims have correspondence relationships with each other. Likewise, the invention specifying matter in the claims and the matters in the embodiment of the present technology with the same name have correspondence relationships with each other. However, the present technology is not limited to the embodiment, but can be embodied by subjecting the embodiment to various modifications without departing from the gist thereof.

Furthermore, the processing procedure described in the above-described embodiment may be regarded as a method having these series of procedures. Furthermore, the processing procedure may be regarded as a program for causing a computer to execute these series of procedures or a recording medium for storing the program. As this recording medium, for example, a compact disc (CD), a MiniDisc (MD), a digital versatile disc (DVD), a memory card, a Blu-ray (registered trademark) Disc, or the like can be used.

Note that the effects described herein are not necessarily limitative and the effects of the present technology may be any of effects described in the present disclosure.

Note that the present technology can also be configured as follows.

(1) An image processing apparatus including:

a cutout processing unit that cuts out a part of the input frame as a current cutout frame on the basis of movement of the imaging unit each time the input frame is imaged by the imaging unit;

a frame memory that holds the current cutout frame as a past cutout frame;

and a synthesis processing unit that synthesizes the current cutout frame and the past cutout frame and outputs a result as a synthesis frame.

(2) The image processing apparatus described in above (1) further including:

a motion amount acquisition unit that acquires a motion amount of the imaging unit within a period from one to the other of exposure timings of consecutive two of the synthesis frames, as a motion amount between synthesis frames; and a synthesis frame correction unit that cuts out a part of the synthesis frame as an output frame on the basis of the motion amount between synthesis frames.

(3) The image processing apparatus described in above (2)

further including a motion amount acquisition unit that acquires a motion amount of the imaging unit within a period from a starting point timing that is between one exposure timing and another exposure timing of consecutive two current cutout frames, to the one exposure timing, as a motion amount within synthesis frame, in which the cutout processing unit cuts out the current cutout frame on the basis of the motion amount within synthesis frame and supplies a result to the holding unit.

(4) The image processing apparatus described in above (3), in which the motion amount between synthesis frames includes a first prediction value indicating the motion amount within a first prediction period from a first start timing in which operation of the motion amount between synthesis frames starts, to the starting point timing, and the motion amount acquisition unit acquires the first prediction value on the basis of the motion amount up to the first start timing.

(5) The image processing apparatus described in above (4), in which a length of the first prediction period does not exceed a predetermined threshold.

(6) The image processing apparatus described in above (4) or (5), in which the motion amount between synthesis frames includes a second prediction value indicating the motion amount within a second prediction period from a second start timing in which operation of the motion amount between synthesis frames starts, to the starting point timing, and the motion amount acquisition unit acquires the second prediction value on the basis of the motion amount up to the second start timing.

(7) The image processing apparatus described in above (6), in which a length of the second prediction period does not exceed the predetermined threshold.

(8) The image processing apparatus described in any of above (1) to (7)

further including a subject motion detection unit that detects a motion vector indicating a direction in which a subject has moved, on the basis of two successive current cutout frames, in which the synthesis processing unit may synthesize the current cutout frame and the past cutout frame on the basis of the motion vector.

(9) An imaging apparatus including:

an imaging unit that images an input frame; an input frame cutout processing unit that cuts out a part of the input frame as a current cutout frame on the basis of movement of the imaging unit each time the input frame is imaged by the imaging unit;

a frame memory that holds the current cutout frame as a past cutout frame; and a synthesis processing unit that synthesizes the current cutout frame and the past cutout frame and outputs a result as a synthesis frame.

(10) The imaging apparatus described in above (9)

further including a sensor for detecting motion of the imaging unit.

(11) An image processing method including:

an input frame cutout processing step for cutting out a part of the input frame as a current cutout frame on the basis of movement of the imaging unit each time the input frame is imaged by the imaging unit; and a synthesis processing step for synthesizing a past cutout frame held in a frame memory that holds the current cutout frame as the past cutout frame, and the current cutout frame, and outputs a result as a synthesis frame.

(12) A program for causing a computer to perform:

a cutout processing step for cutting out a part of the input frame as a current cutout frame on the basis of movement of the imaging unit each time the input frame is imaged by the imaging unit; and a synthesis processing step for synthesizing a past cutout frame held in a frame memory that holds the current cutout frame as the past cutout frame, and the current cutout frame, and outputs a result as a synthesis frame.

REFERENCE SIGNS LIST

100 Imaging apparatus
110 Imaging lens
120 Imaging element
130 Motion detection sensor
140 Recording unit 150 Control unit
200 Image processing unit
210 Camera motion operation unit
211 Prediction operation unit
212 Motion amount between synthesis frames integrator
213 Motion amount within synthesis frame integrator
220 Correction amount operation unit
221 Correction amount within synthesis frame operation unit
230 Camera shake correction amount operation unit
231 Coordinate conversion unit
232 Cutout position determination unit
233 High-pass filter
234 Camera work estimation unit
235 Ideal cutout position determination unit
236 Limitation within correction frame processing unit
240 Cutout processing unit
241 Selector
242 Correction amount selection control unit
243 Positioning processing unit
250 Subject motion detection unit
251 Gain adjustment unit
252 Adjusted motion detection unit
253, 262 Frame memory
260 Image synthesis unit
261 Image synthesis processing unit
270 Rotation correction unit

The invention claimed is:

1. An image processing apparatus comprising:
cutout processing circuitry configured to cut out a part of an input frame as a current cutout frame on the basis of motion of an imager each time a respective input frame is imaged by the imager;
a frame memory that stores a past cutout frame;
synthesis processing circuitry configured to synthesize the current cutout frame and the past cutout frame, and output a result as a synthesis frame, wherein synthesizing the current cutout frame and the past cutout frame is performed after cutting out the part of the input image frame as the current cutout frame; and
a motion amount acquisition circuitry that acquires a motion amount of the imager within a period from a starting point timing that is between one exposure timing and another exposure timing of two consecutive cutout frames, to the one exposure timing, as a motion amount within the synthesis frame,
wherein the cutout processing circuitry cuts out the current cutout frame on the basis of the motion amount within the synthesis frame.

2. The image processing apparatus according to claim 1, wherein:
the motion amount acquisition circuitry acquires a motion amount of the imager within a period from one to another of exposure timings of each of two consecutive synthesis frames, as a motion amount between the two consecutive synthesis frames; and
synthesis frame correction circuitry that cuts out a part of the synthesis frame as an output frame on the basis of the motion amount between the two consecutive synthesis frames.

3. The image processing apparatus according to claim 2, wherein
the motion amount between the two consecutive synthesis frames includes a first prediction value indicating the motion amount within a first prediction period from a first start timing in which operation of the motion amount between the two consecutive synthesis frames starts, to the starting point timing, and
the motion amount acquisition circuitry acquires the first prediction value on the basis of the motion amount up to the first start timing.

4. The image processing apparatus according to claim 3, wherein
a length of the first prediction period does not exceed a predetermined threshold.

5. The image processing apparatus according to claim 3, wherein
the motion amount within the synthesis frame includes a second prediction value indicating the motion amount within a second prediction period from a second start timing in which operation of the motion amount within the synthesis frame starts, to the starting point timing, and the motion amount acquisition circuitry acquires the second prediction value on the basis of the motion amount of the imager up to the second start timing.

6. The image processing apparatus according to claim 5, wherein
a length of the second prediction period does not exceed the predetermined threshold.

7. The image processing apparatus according to claim 1, further comprising a subject motion detection circuitry that detects a motion vector indicating a direction in which a subject has moved, on the basis of consecutive two of the current cutout frames,
wherein the synthesis processing circuitry synthesizes the current cutout frame and the past cutout frame on the basis of the motion vector.

8. An imaging apparatus comprising:
an imager that images an input frame;
input frame cutout processing circuitry configured to cut out a part of the input frame as a current cutout frame on the basis of motion of the imager each time a respective input frame is imaged;
a frame memory that stores a past cutout frame;
synthesis processing circuitry configured to synthesize the current cutout frame and the past cutout frame, and output a result as a synthesis frame, wherein synthesizing the current cutout frame and the past cutout frame is performed after cutting out the part of the input image frame as the current cutout frame; and
a motion amount acquisition circuitry that acquires a motion amount of the imager within a period from a starting point timing that is between one exposure timing and another exposure timing of two consecutive cutout frames, to the one exposure timing, as the motion amount within the synthesis frame,
wherein the cutout processing circuitry cuts out the current cutout frame on the basis of the motion amount within the synthesis frame.

9. The imaging apparatus according to claim 8,
further comprising a sensor for detecting the motion of the imager, wherein the input frame cutout processing circuitry receives the motion detected by the sensor, such that the part of the input frame is cut as the current cutout frame on the basis of the motion detected by the sensor.

10. An image processing method comprising:
performing an input frame cutout processing for cutting out a part of an input frame as a current cutout frame on the basis of motion of an imager each time a respective input frame is imaged by the imager;
storing a past cutout frame in a frame memory;

performing a synthesis processing for synthesizing the past cutout frame and the current cutout frame, and outputting a result as a synthesis frame, wherein performing the synthesis processing for synthesizing the current cutout frame and the past cutout frame is performed after cutting out the part of the input image frame as the current cutout frame; and performing a motion amount acquisition that acquires a motion amount of the imager within a period from a starting point timing that is between one exposure timing and another exposure timing of two consecutive cutout frames, to the one exposure timing, as a motion amount within the synthesis frame, wherein the input frame cutout processing cuts out the current cutout frame on the basis of the motion amount within the synthesis frame.

11. A non-transitory computer readable medium storing program code, the program code being executable by a computer to perform operations comprising:

performing an input frame cutout processing for cutting out a part of an input frame as a current cutout frame on the basis of motion of an imager each time a respective input frame is imaged by the imager;

storing a past cutout frame in a frame memory;

performing a synthesis processing for synthesizing the past cutout frame and the current cutout frame, and outputting a result as a synthesis frame, wherein performing the synthesis processing for synthesizing the current cutout frame and the past cutout frame is performed after cutting out the part of the input image frame as the current cutout frame; and performing a motion amount acquisition that acquires a motion amount of the imager within a period from a starting point timing that is between one exposure timing and another exposure timing of two consecutive cutout frames, to the one exposure timing, as a motion amount within the synthesis frame, wherein the input frame cutout processing cuts out the current cutout frame on the basis of the motion amount within the synthesis frame.

12. The non-transitory computer readable medium according to claim 11, wherein the operations further comprise:

performing a motion amount acquisition that acquires a motion amount of the imager within a period from one to another of exposure timings of each of two consecutive synthesis frames, as a motion amount between the two consecutive synthesis frames; and performing a synthesis frame correction that cuts out a part of the synthesis frame as an output frame on the basis of the motion amount between the two consecutive synthesis frames.

13. The non-transitory computer readable medium according to claim 11, wherein the operations further comprise:

storing the current cutout frame in the frame memory, as a next instance of the past cutout frame, for usage in a next synthesis processing.

14. An imaging apparatus comprising:

a processor, and a memory, the memory storing program code executable by the processor to perform operations comprising:

performing an input frame cutout processing for cutting out a part of an input frame as a current cutout frame on the basis of motion of an imager each time a respective input frame is imaged by the imager;

storing a past cutout frame in a frame memory;

performing a synthesis processing for synthesizing the past cutout frame and the current cutout frame, and outputting a result as a synthesis frame, wherein performing the synthesis processing for synthesizing the current cutout frame and the past cutout frame is performed after cutting out the part of the input image frame as the current cutout frame; and performing a motion amount acquisition that acquires a motion amount of the imager within a period from a starting point timing that is between one exposure timing and another exposure timing of two consecutive cutout frames, to the one exposure timing, as a motion amount within the synthesis frame, wherein the input frame cutout processing cuts out the current cutout frame on the basis of the motion amount within the synthesis frame.

15. The imaging apparatus according to claim 14, wherein the operations further comprise:

performing a motion amount acquisition that acquires a motion amount of the imager within a period from one to another of exposure timings of each of two consecutive synthesis frames, as a motion amount between the two consecutive synthesis frames; and performing a synthesis frame correction that cuts out a part of the synthesis frame as an output frame on the basis of the motion amount between the two consecutive synthesis frames.

16. The imaging apparatus according to claim 14, wherein the operations further comprise:

storing the current cutout frame in the frame memory, as a next instance of the past cutout frame, for usage in a next synthesis processing.

* * * * *